May 14, 1968 W. L. HAMILTON 3,382,781
CAMERA

Filed Feb. 10, 1965 10 Sheets-Sheet 1

INVENTOR.
BY WILLIAM L. HAMILTON
Jack M. Young
ATTORNEY

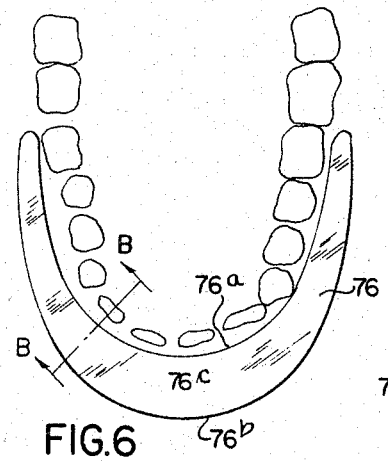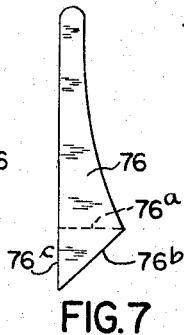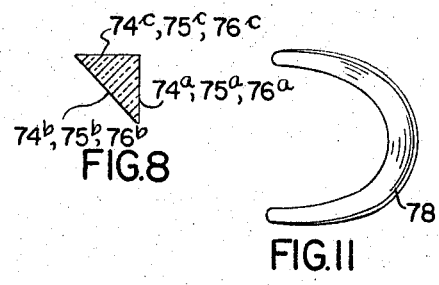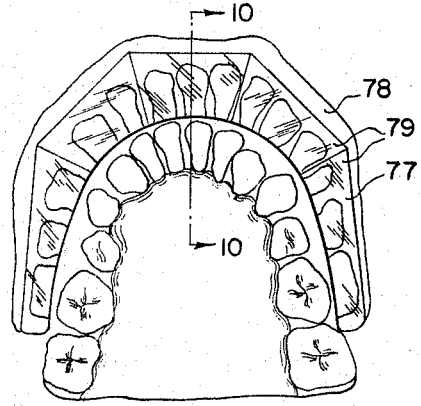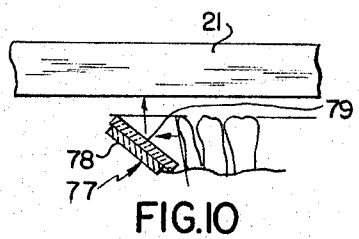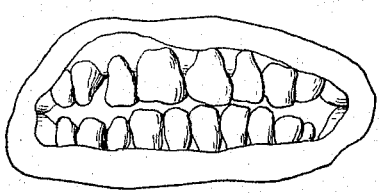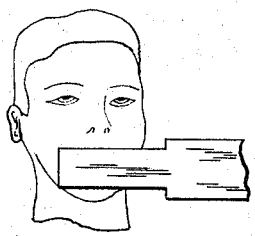

May 14, 1968  W. L. HAMILTON  3,382,781
CAMERA
Filed Feb. 10, 1965  10 Sheets-Sheet 3

INVENTOR.
WILLIAM L. HAMILTON
BY Jack M. Young
ATTORNEY

May 14, 1968 W. L. HAMILTON 3,382,781
CAMERA
Filed Feb. 10, 1965 10 Sheets-Sheet 4
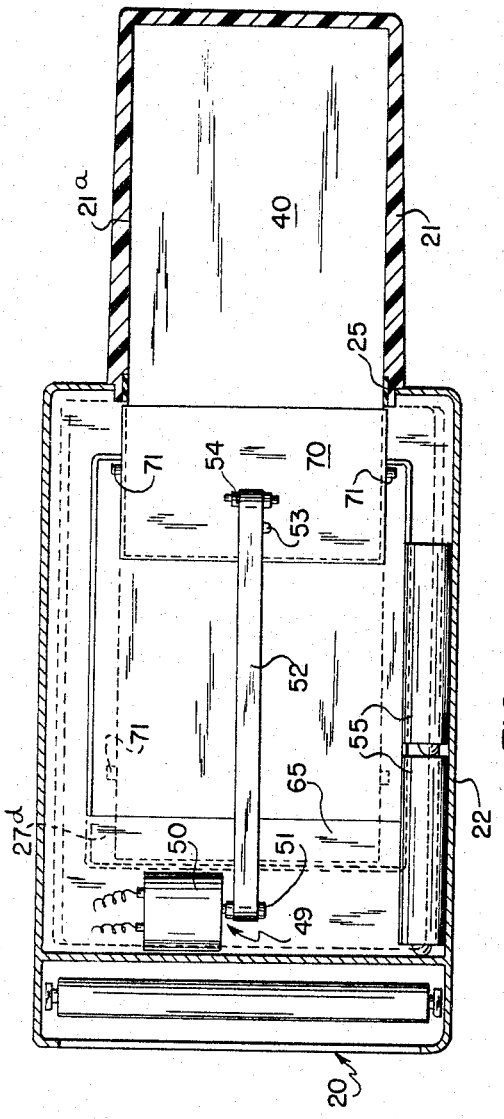
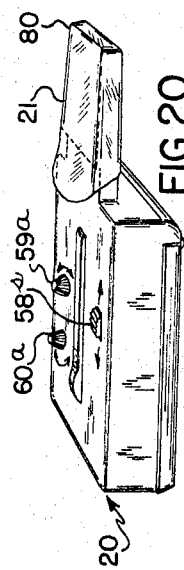
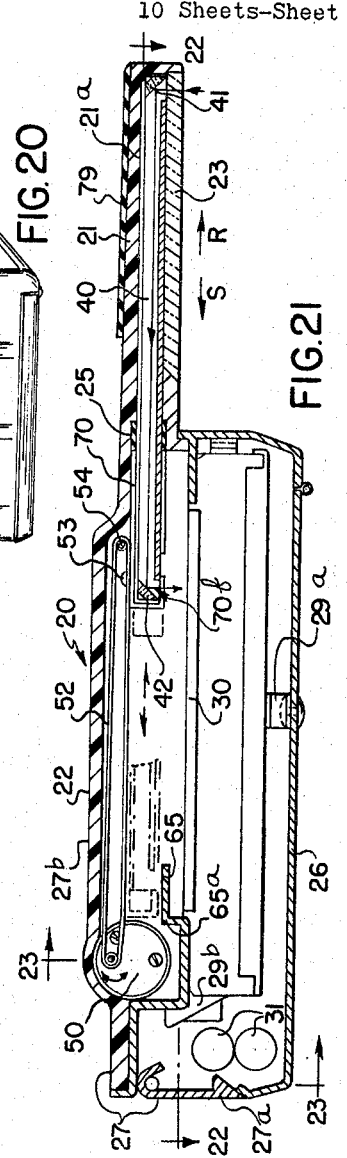
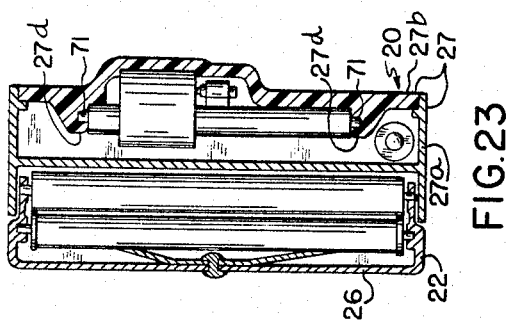
INVENTOR.
BY WILLIAM L. HAMILTON
Jack M. Young
ATTORNEY May 14, 1968 W. L. HAMILTON 3,382,781
CAMERA
Filed Feb. 10, 1965 10 Sheets-Sheet 5

INVENTOR.
BY WILLIAM L. HAMILTON
Jack M. Young
ATTORNEY

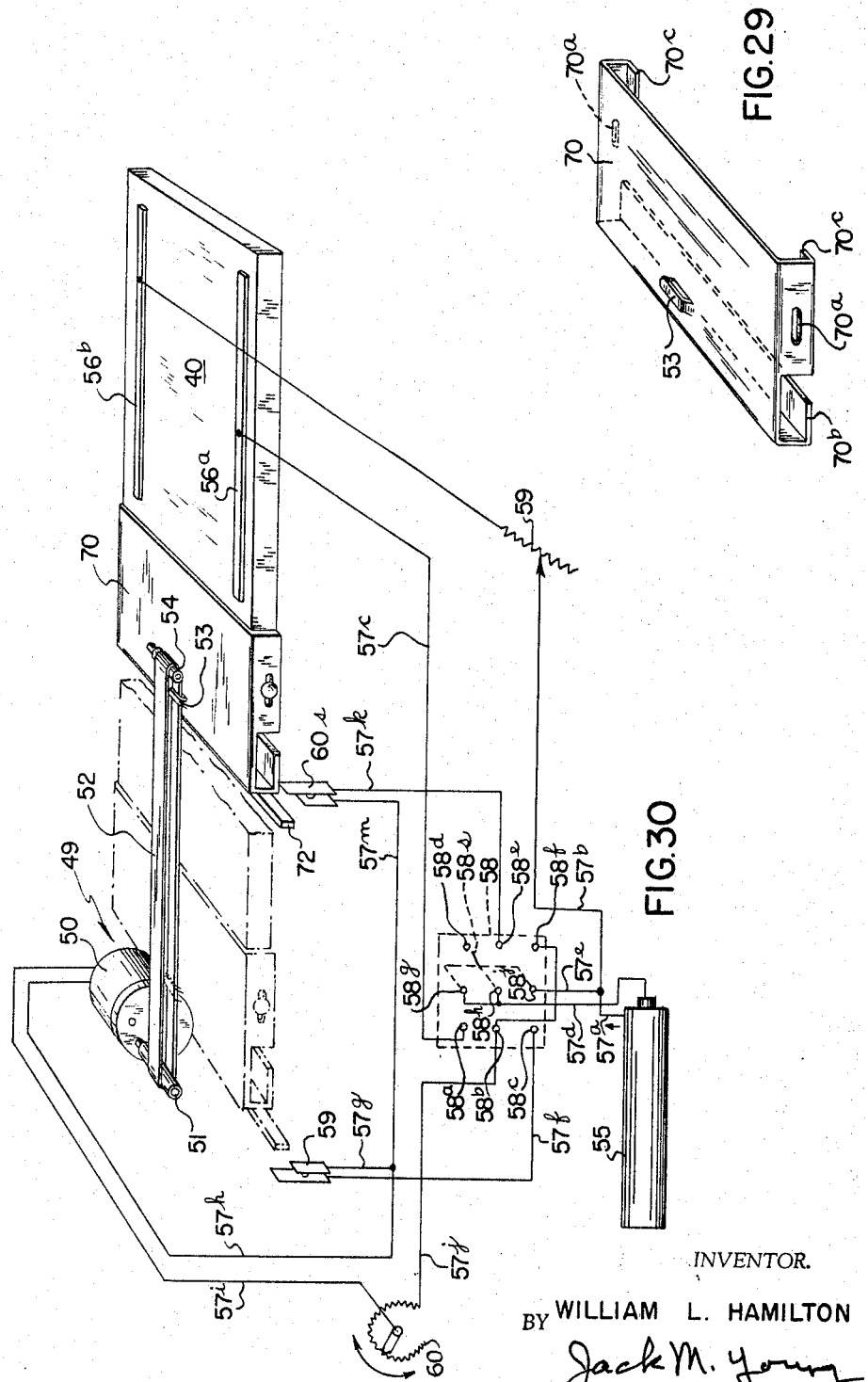

May 14, 1968     W. L. HAMILTON     3,382,781
CAMERA
Filed Feb. 10, 1965     10 Sheets-Sheet 7
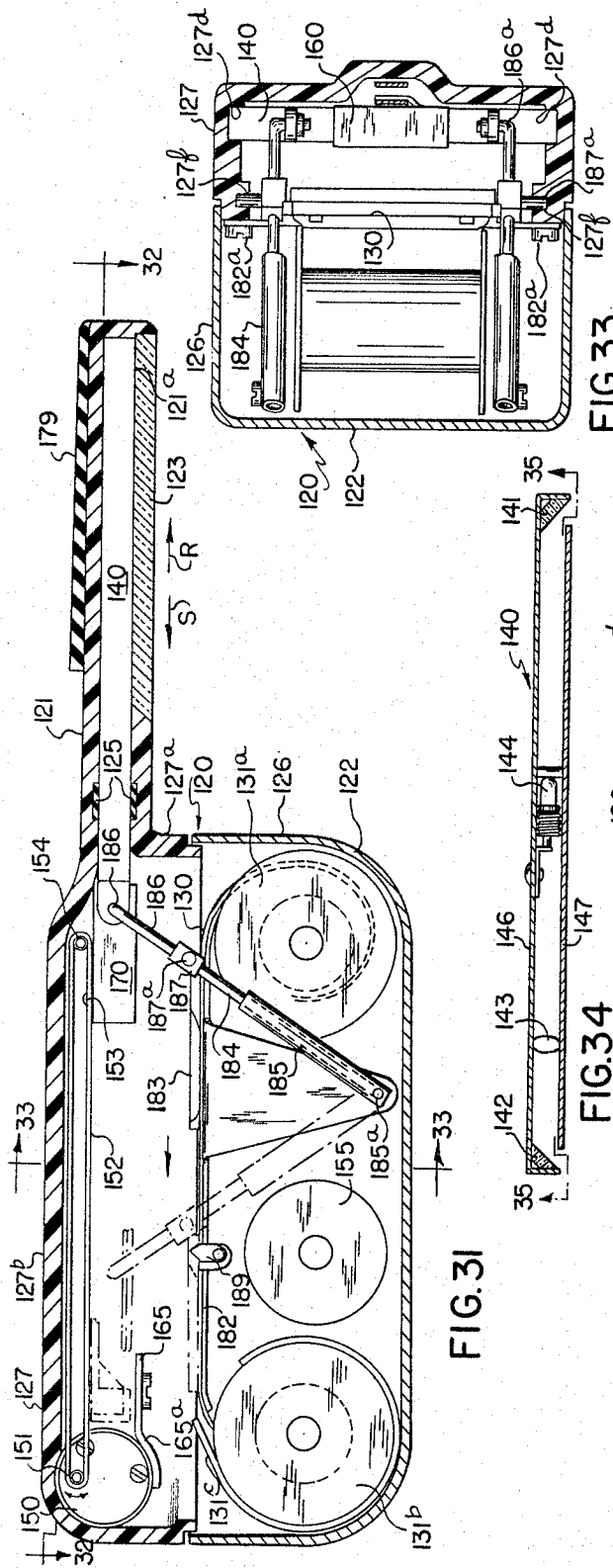
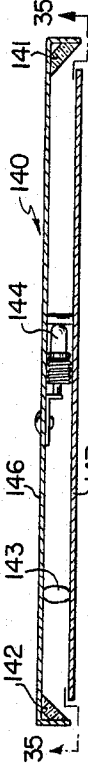
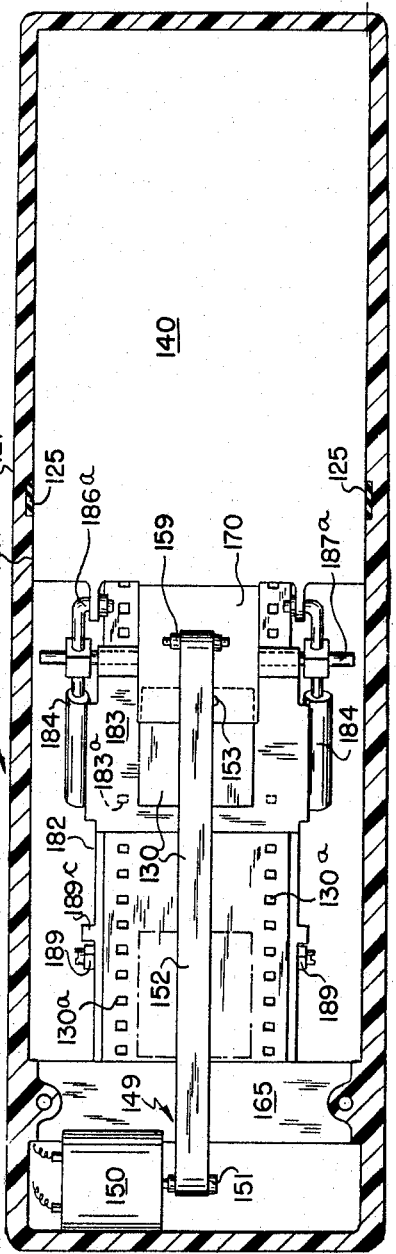
INVENTOR.
BY WILLIAM L. HAMILTON
Jack M. Young
ATTORNEY May 14, 1968 W. L. HAMILTON 3,382,781
CAMERA
Filed Feb. 10, 1965 10 Sheets-Sheet 8
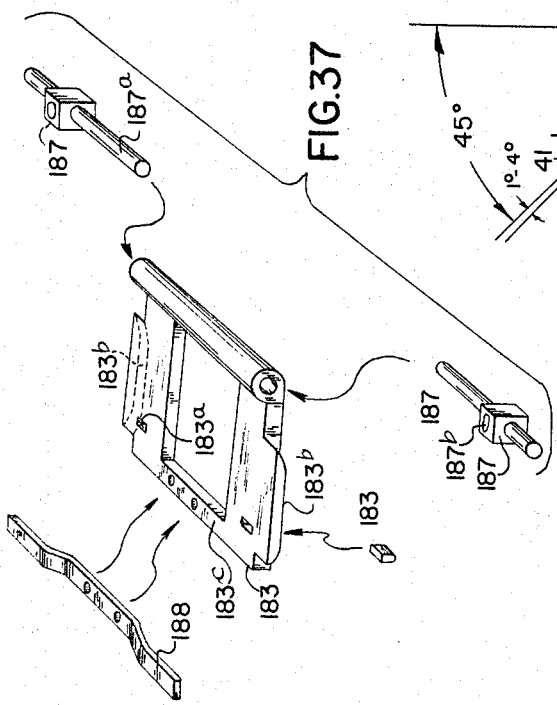
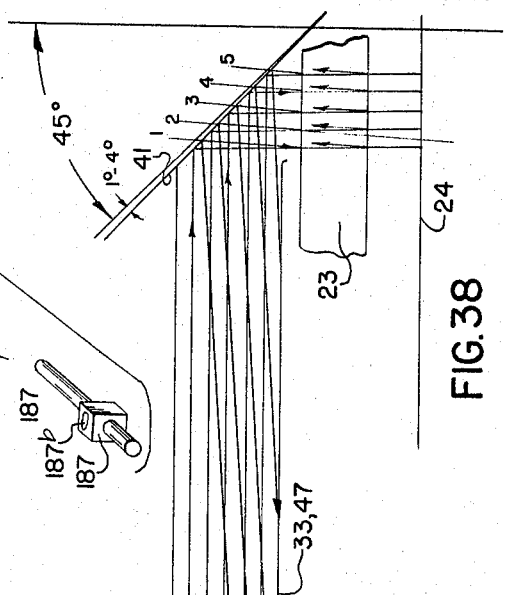
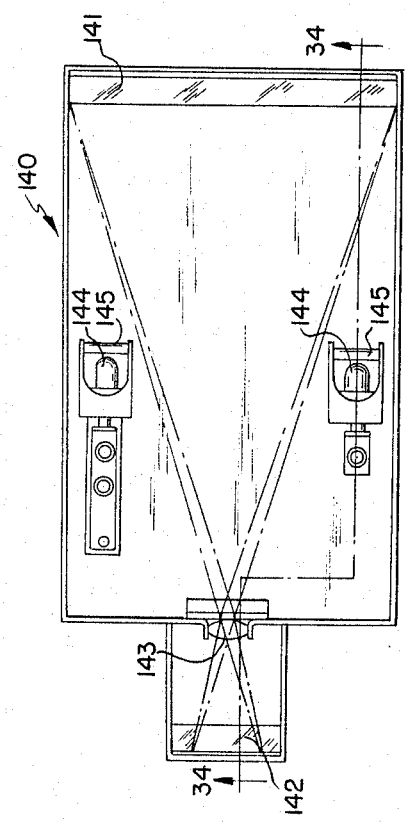
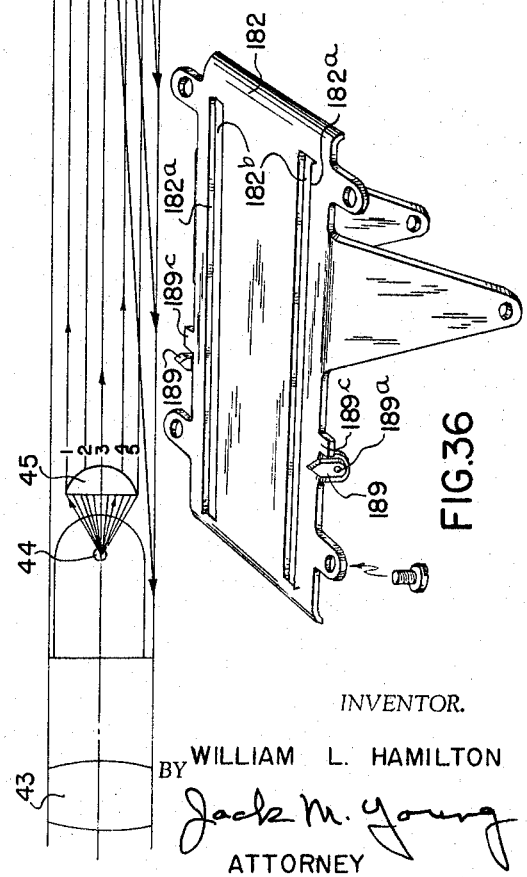
INVENTOR.
BY WILLIAM L. HAMILTON
ATTORNEY May 14, 1968  W. L. HAMILTON  3,382,781
CAMERA Filed Feb. 10, 1965  10 Sheets-Sheet 9

INVENTOR.
BY WILLIAM L. HAMILTON
Jack M. Young
ATTORNEY

May 14, 1968 W. L. HAMILTON 3,382,781
CAMERA

Filed Feb. 10, 1965 10 Sheets-Sheet 10

INVENTOR.
BY WILLIAM L. HAMILTON
Jack M. Young
ATTORNEY

United States Patent Office 3,382,781
Patented May 14, 1968

3,382,781
CAMERA
William L. Hamilton, 9365 Euclid-Chardon Road,
Kirtland, Ohio 44094
Filed Feb. 10, 1965, Ser. No. 431,615
59 Claims. (Cl. 95—11)

ABSTRACT OF THE DISCLOSURE

A dental camera, partly inserted into the mouth, for taking a photograph of chewing surfaces of teeth. It has a flat, rectangular periscope containing lenses, mirrors and lamps; scans view of teeth; delivers image to film outside of mouth; and uses various color or monochrome films, except X-ray. A transparent, disposable sleeve on the viewing end of this camera eliminates fogging from breath and keeps its mouthpiece hygienic.

---

This invention relates to improvements in a camera, and more particularly to a camera for bringing an image for a picture out of a relatively inaccessible place or cavity, like bringing the image of teeth from a human mouth in a dental camera.

One of the objects of the present invention is to provide a dental camera for taking a photograph in a person's mouth of the biting or occlusal surfaces; vestibular, labial and buccal side surfaces; and/or oral side surfaces of the teeth.

A further object of the present invention is to produce on film a full-size and/or scale-reduced-size picture of teeth dimensionally-accurate in a few seconds by a semi-professional operator.

A further object of the present invention is to provide a camera and/or method capable of photographing an object, not normally accessible to the ordinary camera (such as in a cavity), by bringing out the image piecemeal to a convenient location outside of the cavity to the film by scanning the zone of the cavity to be photographed by a continuous sweeping motion with a wide, flat periscope.

A further object of the present invention is to provide suitable means and/or method for photographing the teeth in the mouth, or other normally inaccessible cavity, where at the present time no satisfactory method of photographing has been achieved.

A further object of the present invention is to provide a camera and/or method simplifying the picture taking process so that only a minimum of photographic experience is needed to operate the camera by eliminating as many as possible of the usual photographic variables by having the operation controlled by the "inherent structure" of the camera. This is in contrast to the modern camera of today that simplifies operation only by adding great complexity of mechanism, such as split-view range finders, photoelectric exposure controls, etc.

A further object of the present invention is to provide a camera and/or method keeping the object (the teeth, as disclosed herein) fixed, keeping the film fixed, and moving a periscope optically connecting the film and object in such a manner that the periscope mechanically performs most of the functions required to make a photograph in the ordinary camera.

A further object of the present invention is to provide a camera and/or method having the film and the object approximately coplanar during the picture taking process.

A further object of the present invention is to provide an apparatus and/or method for transferring the image of an object to photographic film by line scanning in continuous translation to produce an erect and unreverted image on a photograph.

A further object of the present invention is to provide a camera and/or method characterized by its novel modes of operation, ability to make photographs heretofore unobtainable, economy of manufacture, structural simplicity, ease of assembly of its component parts, inexpensive manufacturing costs, strong and sturdy nature, operating efficiency, ease of use, low operating cost, attractive appearance, and/or multiplicity of functional advantages for some component parts or method steps.

These and other objects of the present invention will become more fully apparent by reference to the appended claims as the following detailed description proceeds in reference to the accompanying drawings wherein:

FIG. 6 is a top plan view taken generally along the line A—A in FIG. 1 of the light deviating means shown specifically as a third form of prism for photographing the vestibular, labial and buccal surfaces of the teeth;

FIG. 7 is a side elevational view of the prism in FIG. 6;

FIG. 8 is a vertical sectional view taken generally along the line B—B through the prism in FIGS. 3 and 6;

FIG. 9 is a top plan view of the occlusal plane of the teeth of the lower jaw and of a light deviating means shown specifically as mirrors for photographing the vestibular, labial and buccal surfaces of the teeth;

FIG. 10 is a vertical sectional view taken generally along the line 10—10 in FIG. 9 in approximately the same position as in FIG. 1;

FIG. 11 is a top plan view of the curved retainer strap supporting the mirror components in FIG. 9;

FIG. 12 is a photograph of the vestibular and labial surfaces of the teeth and both jaws made by pressing the viewing window of the camera against the teeth at the front of the face;

FIG. 12a is a front elevational view of the camera pressed against the face for making the photograph shown in FIG. 12;

FIG. 20 is a perspective view of a first form of dental camera;

FIG. 21 is a longitudinal sectional view of the dental camera in FIG. 20;

FIG. 22 is a horizontal sectional view taken generally along the line 22—22 in FIG. 21;

FIG. 23 is a vertical sectional view taken generally along the line 23—23 in FIG. 21;

FIG. 29 is a perspective view of the shutter carried by the left end of the periscope in FIG. 21;

FIG. 30 is a schematic view of shutter, periscope, drive mechanism therefor, and energizing electrical circuitry therefor shown in FIGS. 20–29;

FIG. 31 is a longitudinal, vertical sectional view, taken generally along the line 31—31 in FIG. 32, through a second form of dental camera;

FIG. 32 is a horizontal sectional view taken generally along the line 32—32 in FIG. 31;

FIG. 33 is a vertical, transverse sectional view taken generally along the line 33—33 in FIG. 31;

FIG. 34 is a vertical sectional view of the periscope in the second form of camera shown in FIGS. 31 and 32 with this view taken generally along the line 34—34 in FIG. 35;

FIG. 35 is a horizontal, top facing, sectional view of the periscope taken generally along the line 35—35 in FIG. 34;

FIG. 36 is a perspective view of the film track in FIGS. 31 and 32;

FIG. 37 is an exploded, perspective view of the film traverse frame or carrier in FIGS. 31 and 32;

FIG. 38 is a schematic view of one of the lamps, collimating lens, mirror, camera window, object and photographic lens and the optical light path therethrough showing the orientation of the mirror to prevent reflection of the image of the lamp in the photographic lens;

Figure 1:
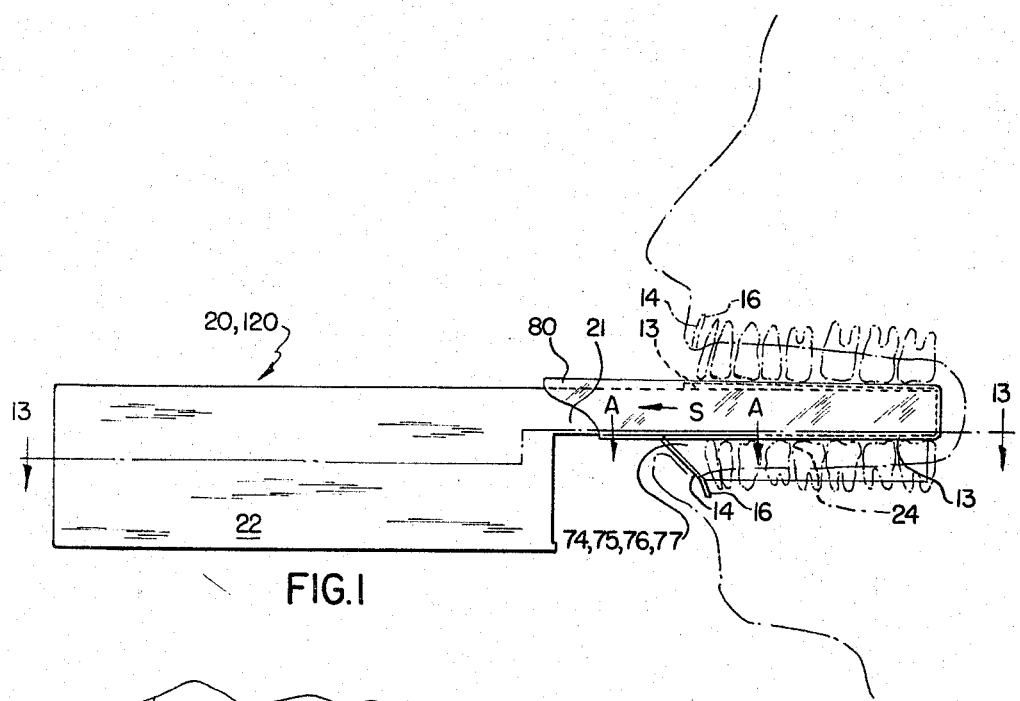
FIG. 1 is a side elevational view of the dental camera and associated light ray deviating means (prism or mirror) associated therewith, and a dot dash line view of the human being having teeth photographed by said camera.
Figure 2:
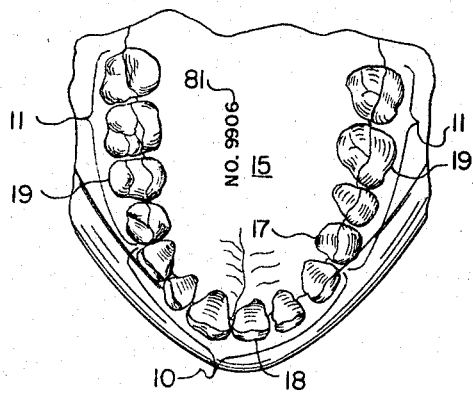
FIG. 2 is a photograph taken by the camera of the occlusal surface of the teeth and one of the jaws in FIG. 1.
Figure 40:
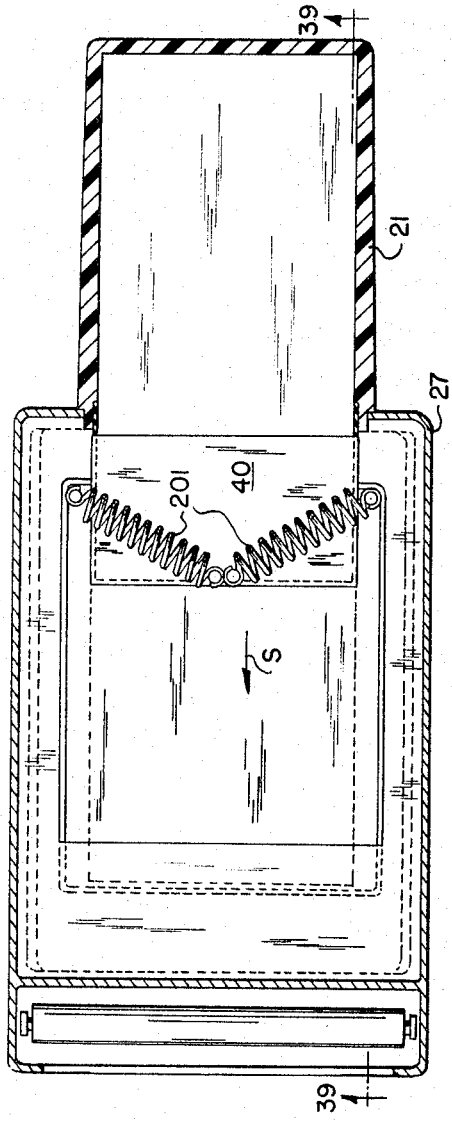
FIG. 40 is a horizontal sectional view taken generally along the line 40—40 in FIG. 39.
Figure 39:
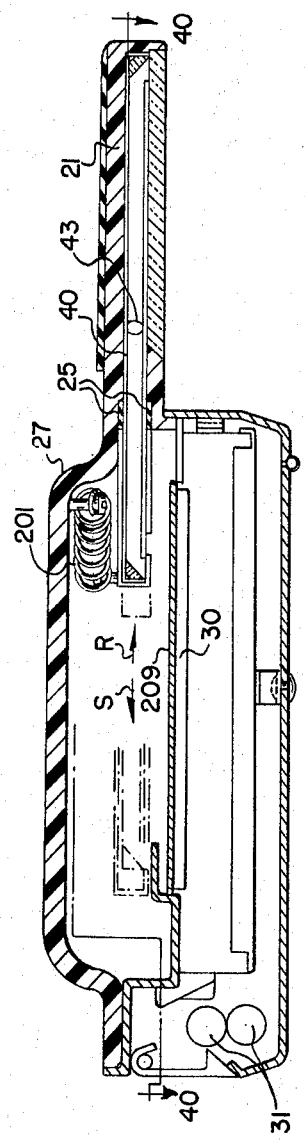
FIG. 39 is a vertical, longitudinal sectional view taken generally along the line 39—39 in FIG. 40 through a first modification of the first form of camera shown in FIG. 21.
Figure 41:
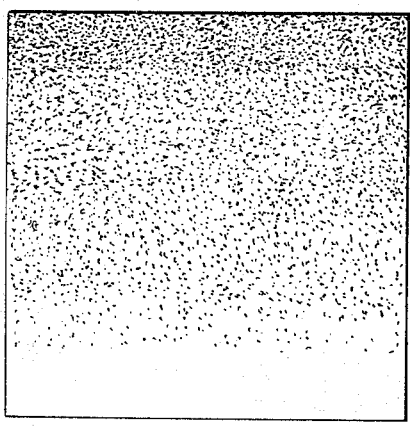
FIG. 41 is a top plan view of a linearly graduated, variable density filter located over the film in FIG. 39.
Figure 42:
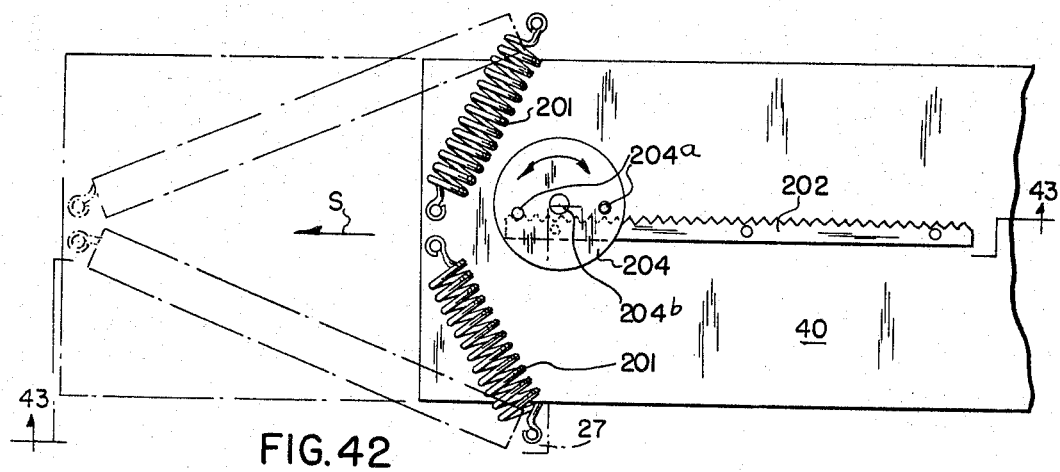
FIG. 42 is a schematic view of a further modification of FIG. 40, namely a second modification of the first form of dental camera, with this view generally taken along line 42—42 in FIG. 43 and showing only a portion of the dental camera in FIG. 40.
Figure 43:
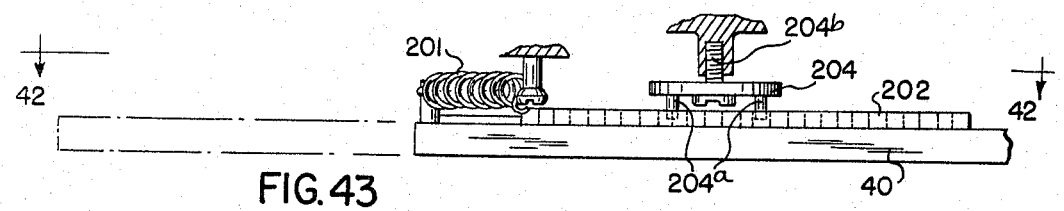
FIG. 43 is a vertical sectional view generally taken along the line 43—43 in FIG. 42.
Figure 44:
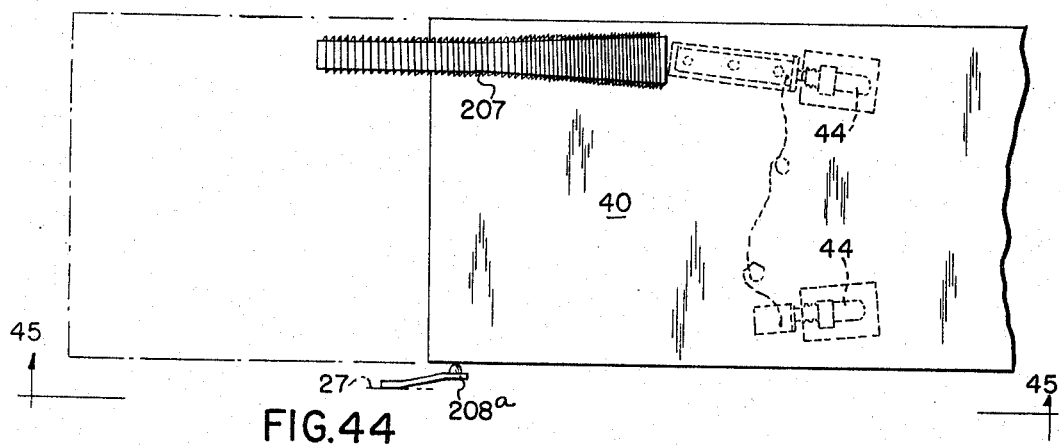
FIG. 44 is a top plan view of a further modification of FIG. 40, comprising a third modification of the first form of dental camera, with this view taken generally along the line 44—44 in FIG. 45.
Figure 45:
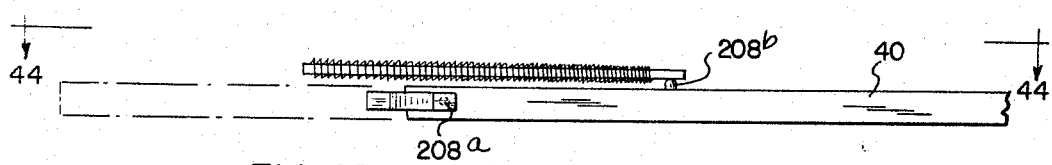
FIG. 45 is a vertical view taken generally along the line 45—45 in FIG. 44.

FIGS. 1–45 in the drawings can be basically broken down in this manner. FIGS. 1, 13, 14 and 38 are generally generic to all forms of the invention illustrated; FIGS. 1 and 12a show the two methods of using this camera to photograph teeth; FIGS. 2, 9 and 12 show the three basic types of tooth photos obtained; FIGS. 3, 4, 5, 6, 7, 8, 9, 10 and 11 either show the different types of light deviating means, including prisms and mirrors, for photographing the vestibular, labial, buccal or oral side surfaces of the teeth or show components thereof; FIGS. 15, 16, 17, 18 and 19 relate to the camera mouthpiece and sanitary sleeve therefor; FIGS. 20–30 relate to the first form of dental camera; and FIGS. 31–37 relate to the second form of dental camera. FIGS. 39, 40 and 41; FIGS. 42 and 43; and FIGS. 44 and 45 relate respectively to three separate modifications of either form of dental camera.

In order that the following description may be easily understood, an explanation is given of the stomatologic terminology on dental anatomy used herein. These terms include anterior teeth 10 in FIG. 2; posterior teeth 11 in FIG. 2; occlusal surfaces 13, 13 in FIG. 1 defined as the masticatory surfaces of the teeth; vestibulum oris 14 defined as the part of the mouth outside of the teeth; cavum oris proprium 15 in FIG. 2 defined as the part of the mouth inside of the teeth; vestibular surfaces 16 in FIG. 1 defined as the surfaces of the gums and teeth facing the vestibulum oris; oral surfaces 17 in FIG. 2 defined as the surfaces of the teeth facing the cavum oris proprium; the molars and premolars 11, also called the lateral teeth, the front teeth 10, including incisors and canines; labial surfaces 18 defined as the surfaces of the front teeth 10 facing the lips; and buccal surfaces 19 defined as the surfaces of molars and premolars 11 facing the cheeks The camera disclosed herein has many uses. It can be used to photograph the interior of cavities not accessible to present cameras. These cavities may include the interior of a casting or hole for industrial purposes, the interior of the mouth for photographing dental work, etc. The description hereafter will be restricted to describing this camera as a dental camera, but it should be readily apparent that the camera has many other uses relating to bringing an image for a picture out of a relatively inaccessible place or cavity, such as described herein for the human mouth.

This camera disclosed herein has substantial value as a dental camera to make the following dental records:

(1) For armed forces medical records;
(2) For legal records for dental surgery performed by dentists;
(3) For orthodontists to observe *progress* in cases of teeth straightening over various periods of time;
(4) For orthodontists to observe over a period of time the *permanency* of teeth straightening operations;
(5) To aid dentists in explaining extensive, proposed work to a patient;
(6) To serve as a teaching aid in dental schools;
(7) To serve as text book preparation in dental schools;
(8) For consultation between dentists on a particular case when the presence of a patient is not convenient;
(9) To aid in human identification in police work;
(10) To simplify keeping the health records of children in school; and
(11) To help the dentist "make friends" with a new child by starting with a painless, interestiving activity.

One of the main reasons why this camera is especially usable as a dental camera is that the camera has an extremely simple mode of operation in contrast with the complex cameras frequently encountered in the present day and age.

This dental camera has the advantage of giving accurate photographs. This is of particular benefit to the orthodontists because the photograph obtained is substantially perfect orthographically along the direction of scan or depth of the mouth cavity to give on the film true relative dimensions of the object to the image along its depth. In other words, a "straight down view" is obtained along the cavity depth of the picture, as opposed to the perspective view obtained by any other common type camera. Also, the picture is exactly the same size (either to full scale by the first form of camera in FIGS. 20–23 or to proportionately reduced scale by the second form of camera in FIGS. 31–33) as the object in the direction of scan. This feature enables the orthodontist to directly and accurately compare "before and after" photos. Any Polaroid prints obtained from the camera in FIGS. 20–23 are especially accurate because they do not stretch or shrink from wet processing, as conventional films may do. It may be possible for the orthodontist to make and fit some braces, and other dental appliances, accurately without resorting to plaster models by using these photographic prints.

The present invention relates to not only the camera or apparatus but also the method of taking pictures coming within the scope of the description herein.

A brief consideration of the photographs in FIGS. 2, 9 and 12 will show that dental anatomy is clearly disclosed therein. Each of the teeth is clearly shown, including anterior and posterior teeth (incisors, cuspids, bicuspids and molars). There is clearly shown not only the details of each tooth (including both fixed and permanent bridges, artificial crowns, inlays, complete and partial dentures, fillings, developmental lines or grooves, fossae, inclined planes, contact points, cusps, fissures, pits and ridges) but also the relationship they bear to each other. The oral, labial, buccal and occlusal surfaces of the teeth are clearly shown. Hence, one photograph of the teeth in each jaw yields a complete dental record. This complete dental record is shown in the FIG. 9 drawing, while FIGS. 2 and 12 show only partial records. FIG. 12 shows only a photograph of the labial surfaces of the teeth and the corresponding vestibular surfaces.

Figure 13:
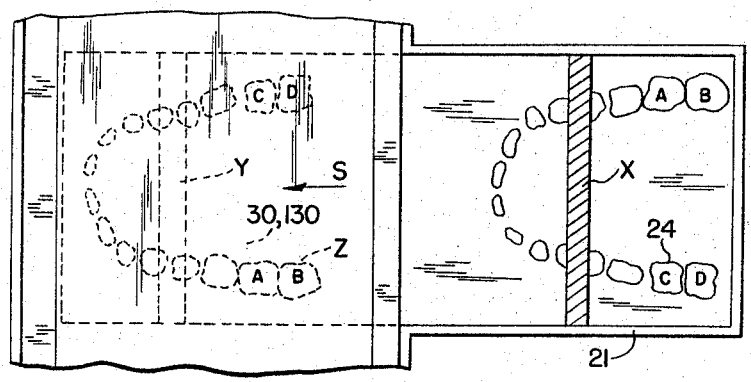
FIG. 13 is a horizontal, schematic view taken generally along the line 13—13 of FIG. 1 showing "line scanning" method for removing the image of the teeth piecemeal from the occlusal surface of the teeth on the right and transferring this image onto the film on the left.

Each form of camera disclosed herein has generically the same structure and mode of operation. Camera 20 in FIGS. 1, 20, 21, 22 and 23 includes mouthpiece 21 having transparent viewing window 23 pressed against the object 24 (against the occlusal surface 13 of the lower teeth in FIG. 1), and has camera body 22 containing film 30 in a suitable film carrier. Illuminating lamps 44 in FIGS. 24, 26 and 28 on periscope 40 direct light rays to the right in FIGS. 1, 21, 24 and 26 in the manner shown by the arrows in FIG. 38 against light deviating means 41 (here shown as a mirror), downwardly in the direction of the arrows in FIG. 38 through transparent window 23 against object 24, upwardly from object 24 against mirror 41, to the left through photographic lens 43 in FIGS. 24 and 26 against left hand light deviating means 42 (here shown as a mirror in FIG. 21), and downwardly in the direction of the arrows onto film 30. It should now be apparent that object 24 is not accessible to an ordinary camera to be photographed. Therefore, scanning periscope 40, as it slides to the left in FIGS. 1, 13 and 21 in scan direction S, will bring the image from object 24 for the photo piecemeal out of the mouth to the image location on film 30. It should now be apparent in FIG. 13 that the scan line or band X on object 24 is transmitted by periscope 40 as a scan line or band Y on film 30 to generate image Z on the film as an erect but reverted image of the object, as will be brought out in more detail hereinafter. The instantaneous scan band X, seen by the periscope, and the instantaneous scan band Y, delivered to the film by the periscope, are shown in FIG. 13. Sliding periscope 40 delivers in one continuous translation the image from fixed object 24 to fixed film 30 with the film and that object being generally coplanar during the picture taking process and being optically connected by photographic lens 43. Periscope 40 scans object 24 and delivers narrow band Y, approximately 3/16 x 2½ inches, of image Z to negative film 30. At any instant during the taking of the picture, periscope 40 "sees and delivers" this narrow band Y perpendicular to the direction of picture taking scan S in FIGS. 1, 13, 21 and 31. This is called "line or band scanning" in contrast with spot or flying dot scanning used in television picture tubes. It will be apparent hereafter that the periscope mechanically performs most of the complicated functions, now performed by complex mechanisms on cameras, required to make a photograph.

Hereafter, FIGS. 1–30 and 38 will be described in detail to give the generic features of all of the cameras disclosed herein. Thereafter, the theory of the optics in these cameras, and the differences in structure and mode of operation of the different forms and modifications of the cameras will be described in detail.

Camera 20 in FIGS. 20–28 include interconnected mouthpiece 21 and camera body 22.

Mouthpiece 21 has a sleeve type body in FIGS. 1, 15, 16, 17, 18 and 19 having cemented therein glass or transparent, object viewing window 23 having a low reflective coating on both surfaces to minimize the reflection of light bulbs 44 directly back into lens 43 so as to help increase the "contrast" of the picture; encasing periscope 40 with a slide type, telescopic connection in cavity 21a; and having light trap 25 surrounding the periscope to put the necessary drag thereon and to prevent light entrance or leakage past the edges thereof. Light trap 25 comprises a strip of black velvet or velure cloth cemented in a recess in the bore of the body of mouthpiece 21.

Camera body 22 includes camera housing 27 having back 26 hinged thereto to permit changing film 30 and batteries 55 therein; and includes periscope 40, drive 49, shutter 70, mask 65 and other appropriate camera parts therein.

Sliding periscope 40 includes suitable light deviating means, either prisms or mirrors but here shown as mirrors 41 and 42 respectively located at the object and film end of the periscope; photographic lens 43; and two lamps 44.

Periscope and shutter drive 49 have many different parts. Electric motor 50 is preferably a 3 volt D.C. electric motor with a built-in gear reducer having a short length of rubber tubing 51 telescoped over its drive shaft to form the driving drum for endless cloth, or rubberized cloth, drive belt 52 fastened to shutter 70 by clip 53, or a suitable rivet, to carry the motion of motor 50 to shutter 70 and periscope 40 in either scanning direction S or reverse direction R. Idler roller 54 supports the right end of belt 52 and has its ends suitably journaled in recesses in the top of camera housing 27. Motor 50 is cylindrical on the outside, is pressed lightly into a cavity in the top of camera housing 27, and is held in this cavity by the frictional contact of a clip on portion 65a so that motor 50 can be rotated slightly as necessary to tighten belt 52. This is possible because the output shaft of motor 50 is off center from the central motor axis. One or more batteries 55 energize and power motor 50 and lamps 44.

Mask 65 is rigid with camera housing 27, being either integral therewith or fastened stationary thereto, and automatically ends the scan exposure as periscope 40 sweeps over it in scan direction S.

Camera body 22 forms a film carrier located outside the mouth cavity in FIG. 1 and adapted to support film 30 fixed during picture taking relative to object 24 being photographed and in a film location plane approximately coplanar with object 24 being viewed through viewing window 23 during picture taking.

Periscope 40 delivers a proper image Z for the photo with this image erect, reverted and properly focused on film 30. This requires photographic lens 43 and two properly placed plane mirrors or prisms 41 and 42. Periscope 40 serves as means line scanning in continuous translation in scanning direction S across object 24 and film 30 during picture taking to impose scanned image Z of object 24 on film 30 to bring this image out of the mouth cavity in FIG. 1 piecemeal during picture taking. Periscope 40 is really a lens carrier carrying movable lens 43 and lights 44 traveling with periscope 40 during scanning. Lens 43 optically connects film 30 and object 24 by line scanning during relative movement of this lens relative to the object and film.

Two light beam deviating means 41 and 42 on periscope or carrier 40 straddle lens 43, face lens 43, and respectively face associated object 24 and film 30 with both the film and object being located on the same side of the axis of the lens and with the lens located along the light path from the object to the film. Each light beam deviating means 41 and 42 changes the direction of the image carrying light beam between generally inclined (right angle oriented: to and from object 24 and to film 30) to the same direction (along the length of, and within periscope 40 between mirrors 41 and 42) as scan direction S and periscope travel. The direction of light travel is sequentially along the arrows in FIG. 38 from lamp 44 toward the right through collimating lens 45 directing the light from lamps 44 to object 24; against mirror 41; downwardly through transparent window 23 against object 24 generally perpendicular to the occlusal plane; upwardly from object 24 through window 23 against mirror 41; to the left through photographic lens 43 in FIGS. 38, 21 and 26 against mirror 42; and downwardly in FIG. 21 against film 30 located generally parallel or coplanar with the occlusal plane.

Periscope 40, as shown in FIGS. 24–27, is a rectangular box made of thin sheet metal containing camera photographic lens 43, two or more light bulbs or lamps 44, and two front surface mirrors 41 and 42. Periscope 40 includes top cover 46 and bottom cover 47 connected together by screws 48 to make a complete assembly so that the periscope accurately fits and slides in cavity 21a in FIGS. 18, 19, 21 and 22. Two sponge rubber edge strips 35 are located along the opposite side edges of periscope 40 to hold bottom cover 47 tightly against bent over flanges 46a on top cover 46 to exclude outside light. Two sponge rubber, light leak stopper strips 36 coact with V-oriented flanges 46b, secured to top 46, to form a light-tight diaphragm (except at the lens) across the periscope. This corresponds to the front of a conventional camera.

Each lamp 44 is screwed into a metal socket 37 electrically grounded to metal covers 46 and 47 and is carried by periscope 40 for illuminating object 24 during movement in scan, forward direction S. Each socket 37 has a spherical reflector surface 37c in FIG. 26 with the filament of lamp 44 located at the center of curvature (not at the focus). The lamps of lights 44 provide illumination traveling with scanning periscope 40 to shine onto object 24 through the same mirror 41 that scans the object 24 for lens 43 and film 30. Good results have been obtained by using a General Electric No. 329 miniature bulb, or the equivalent, positioned with the filament extending horizontally. A contact strip 38 in FIG. 28 engages the center of the bulb, is spaced by suitable insulation and securing rivets from metal top cover 46, and carries a sliding electrical contact 38a for picking up current from parallel electrical strips 56a and 56b secured to mouthpiece 21 in cavity 21a in FIGS. 19 and 30, as will be described in more detail with respect to FIG. 30 hereafter. Each metal lamp socket 37 has two parallel extending wings 37b in FIG. 26 having secured by lugs 37a between their distal ends cylindrical lens 45 to collimate the light in the vertical plane while allowing it to spread in the horizontal plane. This lens is detachably held between lugs 37a so that it can be removed to permit replacement of lamp bulb 44. However, since the expected lamp life would make many thousands of pictures, the bulb could be permanently soldered into place and the lens could be cemented to wings 37b.

Of course, light 44 could be put outside periscope 40. However, this outside location has the disadvantage of increasing the "dead end" length of mouthpiece 41 to the point where the camera would miss photographing some people's wisdom teeth (third molars). Furthermore, this outside location might require that the closed surfaces of the teeth might need to be spread apart farther than the position shown in FIG. 1, or might require that the lamp end of mouthpiece 21 be pushed against the throat or mouth tissue. Either of these alternatives might cause the person being photographed considerable discomfort.

Lens 43 can be a fixed focus lens because the outer surface of mouthpiece window 23 defines the plane of focus of object 24. A range finder is obviously not needed. Lens stop 34 is secured to top cover 46 and provides a fixed size aperture, corresponding to the iris or diaphragm on a camera. A fixed sized aperture can be used because it is possible to easily vary the scan speed over a wide range, as will be brought out in more detail hereafter during the description of FIG. 30. This lens stop 34 is made of thin metal and can be located in front of the lens, behind the lens, or between the elements of lens 43, as is well understood in the camera art.

The inside surface of periscope 40 (on the facing surfaces of flanges 46b and of covers 46 and 47 straddling the light beam path) may be covered with black flock, or flocked paper, to absorb unwanted light reflections. Flock is considerably more efficient in absorbing light reflections than flat black paint.

Figure 26:
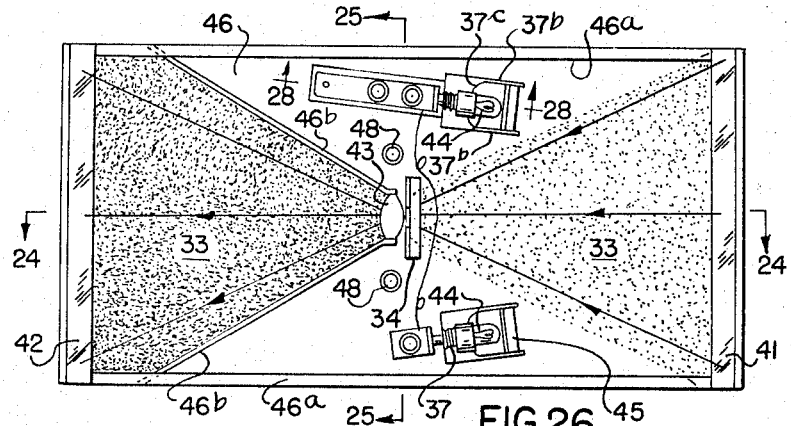
FIGS. 26 and 27 are top plan views respectively of the upper and lower halves of the periscope in FIGS. 24 and 25.
Figure 24:
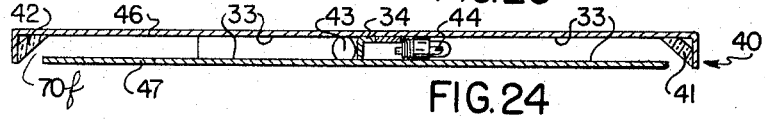
FIG. 24 is a vertical sectional view taken generally along the line 24—24 in FIG. 26 through the periscope of the camera shown in FIG. 20 with this view of the periscope being generally the same as that shown in FIG. 21, which has some parts omitted.
Figure 25:
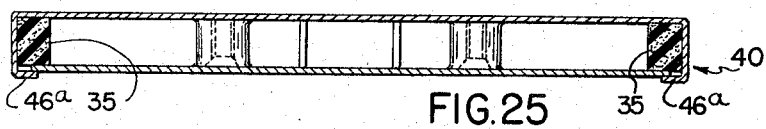
FIG. 25 is a vertical, transverse sectional view through the periscope taken generally along the line 25—25 in FIG. 26, illustrated at double the scale of FIG. 26.

Alternative structures to periscope 40 readily suggest themselves. Although periscope 40 has been disclosed as having a framework comprising two interconnected covers 46 and 47, it should be readily apparent that the framework may consist of a solid plastic or glass member of generally B-shape when FIG. 26 is turned 90° with mirror 41 located on the bottom of the B. Then, the bottom and top bars of the B would support the mirrors 41 and 42 respectively and the center bar would have a cutout for supporting lens 43. The top and bottom surfaces of the B-frame could be covered with a sheet of flocked paper or foil to provide the top and bottom walls 46 and 47 shown in FIGS. 24 and 25. Lamps 44 and sockets 37 may be mounted in the same middle bar of the B-shape. Also, prisms may be used as light beam deviating means in place of mirrors 41 and 42.

Suitable light filters can be used to darken the image of the red mouth tissues to give a somewhat greater contrast with the white teeth in the photographs in FIGS. 2, 9 and 12. Here, green plastic filter 32 can be placed in FIG. 28 between the coplanar two lugs 37a and between each lamp 44 and its collimating lens 45. A green filter darkens the image of the red mouth tissues to give the desired contrast. Here, the filter does not need optical clarity, as it might need in a camera filter, because here it is not being used over taking lens 43 but instead over lamps 44. Here, cheap, colored acetate is suitable. However, any filter tends to increase the exposure time necessary by several fold, depending on its density. If the filter slows the exposure an undesirable amount, the camera user may prefer not to use it.

It is desirable to eliminate the reflection of light bulbs or lamps 44 off window 23. Tipping mirror 41 as little as 1°, or as much as 4°, from the theoretical 45° angle orientation of the mirror (the position reflecting the image of the light into lens 43) eliminates the reflection of light bulbs 44 off the surface of window 23. Mirror 42 is tipped the same amount and in the same rotational direction as mirror 41. This "delivers" the image to the film at the same angle that it is "seen" from the object, without introducing an optical distortion. The exact tilt required depends upon the geometry of the system. The thinner periscope 40 is in vertical thickness, the less the tilt required. This is especially true when collimated light is provided by lenses 45. The tilt of mirror 41 combined with the collimating effect of lens 45, spreading the light the width of periscope 40 while confining it to the vertical thickness of the periscope between covers 46 and 47, prevents specular reflection of the lamp bulbs off the inner and outer surfaces of window 23, and off the inner and outer surfaces of hygienic sleeve 80 in FIG. 16. Each of these four specular reflections is reflected upwardly in FIG. 38 from the lower surface of window 23, for example, in the direction of the upward arrows against mirror 41 and then diagonally downwardly to the left in the direction of the arrows to be harmlessly absorbed by the flocked surface 33 on periscope cover 47.

Other solutions have been tried but have not been found as successful. A low reflection coating applied to window 23 helps, but was found to nowhere near eliminate the reflection. Polarizing filters were also tried, as filters 32 in FIG. 28, on bulbs 44 and were tried on lens 43 with the filter polarizing axis on the bulbs at right angles to the filter polarizing axis on the lens. This cut down the picture taking light to lens 43 tremendously, but did not altogether kill the direct reflection of bulbs 44.

Motor 50 and lamps 44 are suitably energized and controlled by a thumb-operated, triple pole, double throw, reversing switch 58. Switch 58 is manually movable to close contacts 58a, 58b and 58c to energize lamps 44 and to drive motor 50 in scan direction S and is spring-biased to normally close switch contacts 58d, 58e and 58f in FIG. 30 to drive motor 50 in periscope moving reverse direction R. Suitable control circuitry is shown in FIG. 30. When thumb actuator 58s of switch 58 is pressed to close switch contacts 58a, 58b and 58c, motor 50 pulls shutter 70 and periscope 40 in scanning direction S and turns on lights 44. Lamps 44 are energized by *Circuit No. 1* from battery 55 through line 57a; line 57b; rheostat 59; electric strip 56b; one of the lamp contacts 38a in FIGS. 26 and 28, contact strip 38, lamp 44, and metal socket 37; the metal of top cover 46 in FIG. 24; the other lamps metal socket 37 in FIGS. 26 and 28, lamp 44, contact strip 38, and contact 38a; electric strip 56a; line 57c; closed switch contacts 58a, 58g closed by actuation of switch actuator 58s in FIG. 20 of switch 58; and line 57d to battery 55. Electric strips 56a and 56b are imbedded below the surface in cavity 21a of mouthpiece 21 so they will not be electrically contacted by metal periscope 40. Closing switch contacts 58a, 58b and 58c also moves periscope 40 and shutter 70 in scanning direction S by energizing motor 50 to drive in the forward direction by forming *Circuit No. 2* from battery 55 through line 57a; line 57e; closed switch contacts 58j and 58c; line 57f; normally closed limit switch 59; line 57g; line 57h; motor 50; line 57i; rheostat 60; line 57j; closed switch contacts 58b and 58h; and line 57d to battery 55. As shutter 70 reaches the left end of its scanning stroke S, switch trip 72 carried by shutter 70 will open limit switch 59 to break *Circuit No. 2* to de-energize and stop motor 50. After the photo has been taken on film 30, periscope 40 can be moved in reverse direction R. Since switch 58 is spring-biased to close contacts 58d (this contact not used), 58e and 58f automatically, release of thumb actuator 58s in FIG. 20 will energize motor 50 to drive in reverse direction R for moving shutter 70 and periscope 40 in reverse direction R by forming *Circuit No. 3* from battery 55 through line 57a; line 57e; closed contacts 58j and 58f of switch 58; switch contact 58b; line 57j; rheostat 60; line 57i; motor 50; line 57h; line 57m; normally closed limit switch 60s; line 57k; closed contacts 58e and 58h; and line 57d to battery 55. When switch trip 72 opens limit switch 60s, *Circuit No. 3* is broken and motor 50 is de-energized to stop periscope 40 and shutter 70 in the right hand position.

Hence, it should be apparent that the third pole contacts 58a and 58d are used to turn lights 44 on during the picture scanning stroke S and to leave them off during the return stroke R of periscope 40. This conserves the life of both lamps 44 and batteries 55.

Limit switches 59 and 60s can be eliminated, if desired, by making switch 58 a triple pole, double throw, center-biased switch, and then the camera operator can release switch control button 58s as soon as belt 52 slips. Knobs 59a and 60a in FIG. 20 control respectively rheostats 59 and 60 in FIG. 30 to adjust the intensity of light illumination and to adjust the speed of scanning motor 50. It should be apparent that if motor 50 is run faster, the picture will be lighter and if the motor 50 is run slower, the picture will be darker. Adjusting either of these rheostats will compensate for all variables affecting exposure time, including film emulsion speed, battery voltage deterioration, blackening of lamps 44, dust on the optics (lens 43, prisms 41 and 42, window 23, etc.). Motor 50 traverses periscope 40 at a steady, but adjustable, speed to scan object 24 being photographed. Motor 50 also reverses the return periscope 40 to the starting position by moving it in reverse direction R. Exposure meters or expensive photo-electric exposure controls are not necessary because the illumination on the object to be photographed is completely controlled by the scanning speed. Therefore, the setting of the scan speed remains constant, picture after picture, except for the gradual deterioration of light bulbs 44 and batteries 55. The adjustment for these factors can be made from time-to-time by adjusting knobs 59a and/or 60a without having to waste tryout exposures, as is done with an ordinary camera.

It should now be apparent that the motion of periscope 40 turns lamps 44 on and off at appropriate times, that lights 44 are tied in with the circuit of motor 50, that the rate of travel of periscope 40 determines the length of exposure to the film, and that periscope 40 carries the illuminating lamps 44 and directs the light right where the periscope 40 is looking at object 24.

Shutter 70 in FIGS. 21, 22, 29 and 30 includes lost motion slot 70a securing shutter 70 by coaxial pins 71 to opposite lateral edges of periscope 40; bent over lip 70b is adapted to cover the light outlet from mirror 42 in the manner shown in FIG. 21 when shutter 70 is either at the right hand end of its lost motion travel or is moving in reverse direction R and to uncover the light outlet from mirror 42 when it is moving in scan direction S toward the left hand end of its lost motion travel in FIG. 21; and opposite, inturned channel flanges 70c sliding over periscope 40. Shutter 70 serves as an operative means, responsive to start motion of lens carrier or periscope 40, for opening shutter aperture 70f in FIGS. 21 and 24 by shutter lip 70b to start the exposure of the film as the motor drives in the scanning direction S. Shutter 70b is movable on carrier 40 between positions transmitting and intercepting the scanned light beam between object 24 and film 30. As periscope 40 is moved in reverse direction R in the beginning of this sequence, shutter lip 70b is pulled by belt 52 over the outlet from mirror 42 to intercept the light beam therefrom to cut off exposure of film 30 during movement in this reverse direction R. However, the start motion of drive motor 50 in the forward or scanning direction S sequentially opens shutter aperture 70f of shutter 70 by pulling lip 70b off to the left from the solid line to the dot-dash line position in FIG. 21 to uncover mirror 42 to start exposure of film 30 and then pulls periscope 40 in forward or scanning direction S so that the light beam from mirror 42 strikes film 30 and motor 50 drives periscope 40 in forward direction S throughout its travel after opening of shutter lip 70b. This sliding shutter 70 starts the exposure at the beginning of the scan stroke S and acts as a "dark slide" during the return travel of periscope 40 in return direction R. It has been found desirable to design slot 70a to allow only about 7/32 inch longitudinal motion of shutter 70 relative to periscope 40 so as to allow shutter 70 to cover and uncover a 3/16 inch by 2½ inch wide aperture 70f in the inboard end of periscope 40 under mirror 42.

The shutter does these things. First, during exposure, it opens this aperture 70f in periscope 40. Second, slots 70a in shutter 70 allow motor 50 to rapidly come up to speed under a light load before periscope 40 is started moving in scan direction S. Then, as the end of slots 70a contact pins 71, periscope 40 is suddenly snapped into motion. In this way, a substantially constant scan speed is obtained even at the beginning end of the photo. Third, this delayed starting of periscope 40, when shutter 70 only moves during the beginning of the scan stroke S, also evens out the exposure for the first 3/16 inch strip of the photograph on film 30 in the following manner. Any point in the picture except in this first 3/16 inch will have the entire 3/16 inch aperture 70f pass over it and deliver light to the emulsion on film 30 in the scan band. The first band edge of the picture, however, will not be passed over by any but the one *edge* of aperture 70f provided between shutter lip 70b and the inboard edge of periscope 40. Therefore, in order to have this band edge fully exposed, periscope 40 must remain stationary for a certain length of time. This time is exactly the time it takes shutter 70 to take up the lost motion in slot 70a, if the shutter were going at constant velocity. Also, each other point in the first 3/16 inch will get a correctly compensated time of exposure to correspond to its position as aperture 70f is progressively uncovered. Although this appears to be a minor point, it does help considerably to make the picture good at the edge, which is where the back of the wisdom teeth (third molars) would appear. Hence, this construction provides means for more slowly scanning the beginning of the scan than the rest of the scan so that a uniform light beam would give uniform exposure over film 30 over the whole scan.

Mask 65 cuts off exposure of film 30 at the end of scan travel S of periscope 40 by cutting off the light beam from mirror 42. Light beam deviating means 42 in periscope 40 changes the direction of the image carrying light beam traveling in the direction of the arrows in FIG. 21 from the same direction as the scan to right angularly inclined thereto so that opaque baffle 65 intercepts this light beam at the left end of the scan to cut off the exposure of film 30 at this finish end. Hence, periscope 40 acts as its own shutter by passing over baffle 65.

Camera 20 in FIGS. 21, 22 and 23 successfully operates because it delivers to film 30 an image of object 24 having substantially equal increments of light on equal areas of film 30 throughout the scan. This is assuming, of course, that the object is also of an even intensity, such as a white sheet of paper, if the photo is to have an even intensity along the length of scan. The modifications of this camera shown in FIGS. 39–45 work on this same principle but in a slightly different manner so will be explained separately hereafter. Here, this mode of operation is obtained by having light means 44 illuminate object 24 with substantially steady and unvarying illumination. Also, motor 50 drives periscope 40 in forward or scan direction S at a substantially constant scan speed because motor 50 is a constant speed electric motor. (Here, motor speed characteristics vary according to voltage and load. But since these are constant, the motor speed is constant.) Hence, film 30 is exposed to uniform density even though portions of the film are exposed sequentially instead of simultaneously.

Note that camera 20 includes all the means required for performing the functions required to take a photograph on film 30, including providing the normal functions of controlling film density, shutter and light. Note that such means operate in response to the movement of lens 43. Mask 65 and shutter 70 permit lamps 44 to be energize actuated at the beginning end of scan S and de-energize actuated at the finish end of the scan in response to movement of periscope 40 for so actuating lamps 44, and the light beams therefrom, at each end of scan S. Operative means, responsive to motion of lens carrier 40, cuts off exposure of film 30 at each end of scan S. This operative means includes shutters 70, and especially the lost motion connection at slot 70a and pins 71; and opaque baffle 65.

Many different type dental anatomy pictures can be made with this camera. FIG. 2 is a picture of the occlusal surface of the teeth on one human jaw by using camera 20 in the manner shown in FIG. 1 with the mating occlusal surfaces not separated more than one inch and generally only about one-half inch with most cameras of the disclosed construction, to give the patient being photographed maximum comfort. The image of the occlusal plane on film 30 shown in FIG. 2 is a substantially true orthographic (true orthographic "looks straight down" and would occur if mirror 41 in FIG. 38 were mounted at 45°. This camera looks 2° to 8° off the vertical, as the tipped mirror 41 doubles the deviation of the vertical line of sight) image along the longitudinal axis of the human tongue. FIG. 12 is a picture of the vestibular and labial surface of the teeth taken in the manner shown in FIG. 12a with camera 20. Window 23 is adapted to be pressed against either the occlusal surface in FIG. 1 or the vestibular and labial surfaces in FIG. 12a of the teeth so that camera 20 will take a sharp picture of either of these surfaces when the window is pressed against these surfaces. FIGS. 12 and 12a show how the front teeth are easily photographed by merely pressing transparent window 23 against them so as to scan crosswise (left to right in FIG. 12a) to make this extra photo of the teeth, if so desired.

Suitable light deviating means, either mirrors or prisms, are provided in FIGS. 3–10 for deviating a beam of light containing the image of the vestibular side surfaces of the teeth from the plane of these side surfaces into the plane of the occlusal surface so that camera 20 can simultaneously photograph the occlusal and the side surfaces on film 30. By suitable reconstruction of the light deviating means, the oral side surfaces of the teeth can be similarly photographed, if desired, but generally these oral side surfaces show up well enough in the photograph (see FIG. 2), so do not require use of a light deviating means thereon because the viewing angle of the lens may adequately show the inside surfaces of the teeth to some degree. Hence, the camera simultaneously takes a view of the side surfaces of the teeth and the crowns thereof.

Figure 4:
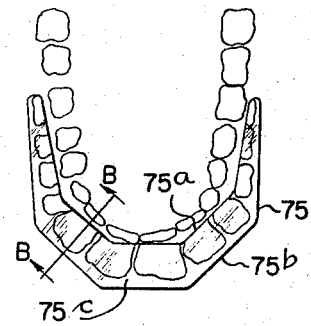
FIG. 4 is a top plan view taken generally along the line A—A in FIG. 1 of the light deviating means shown specifically as a second form of prism for photographing the vestibular, labial and buccal surfaces of the teeth.
Figure 3:
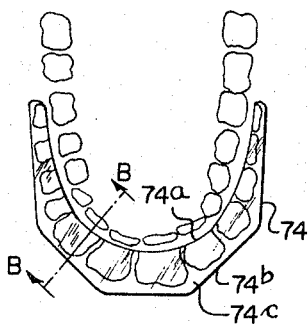
FIG. 3 is a top plan view taken generally along the line A—A in FIG. 1 of the light deviating means shown specifically as a first form prism for photographing the vestibular, labial and buccal surfaces of the teeth.
Figure 5:
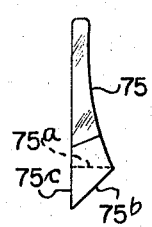
FIG. 5 is a side elevational view of the prism in FIG. 3.

FIGS. 3–8 show horseshoe-shaped prisms enabling the image of the outside surfaces of the teeth to be included in the photo at the same time. Prism 74 in FIG. 3 has an inner surface 74a facing the teeth with a curved horseshoe-shape, and has an opposite or outer surface 74b made in a series of flats defining an angular, segmented surface opposite vestibular, labial and buccal side surfaces of the teeth with prisms 74 extending generally parallel to the occlusal surface. This style prism appears to work the best because it gives the least distortion to the images of the vestibular, labial and buccal surfaces of the teeth of the prisms tested. Prism 75 in FIGS. 4 and 5 shows a series of flats on its inner surface 75a and outer surface 75b defining angular, segmented surfaces facing and opposite the vestibular, labial and buccal side surfaces of the teeth and extending generally parallel to the occlusal surface. This prism 75 is the easiest prism to make of the group of prisms shown in FIGS. 3–7. Prism 76 in FIGS. 6 and 7 has a smoothly curved, horseshoe-shaped curved surface facing and opposite the vestibular, labial and buccal surfaces of the teeth, as shown by inner surface 76a and outer surface 76b with the prism extending parallel to the occlusal surface.

Each of these prisms 74, 75 and 76 is made of glass or clear plastic, such as "Plexiglas," and have respectively top surfaces 74c, 75c and 76c. The three surfaces 74a, 74b, 74c, 75a, 75b, 75c, 76a, 76b and 76c are optically polished and outer surface 74b, 75b and 76b is silvered.

FIGS. 9, 10 and 11 show mirror means 77 serving as the light deviating means to permit photographing the vestibular, labial and buccal or the oral side surfaces of the teeth. Mirror means 77 includes a U-shaped support strap 78, suitably formed, such as from a strip of plastic suitably shaped and fairly rigid, having adhesively secured to its inner surface a plurality of mirrors 79 for projecting the image of the vestibular, labial and buccal surfaces of the teeth into the occlusal plane.

The use of prisms 74, 75 and 76 and mirror means 77 should be readily apparent because each is used in the same way and the usage will be illustrated by describing use of prism 74. Prism 74 can be made in a wide variety of sizes and shapes to fit different patients' dental arches. After the proper shape and size prism 74 is selected, it is sterilized and is swabbed with the anti-fogging agent described in more detail hereinafter. Prism 74 either can be placed loosely in the mouth or can be attached to mouthpiece 21 of camera 20 in the position shown in FIG. 1. It is preferably placed loosely in the mouth so it can be separately sterilized and then placed over sanitary sleeve 80 earlier telescoped over mouthpiece 21.

If the prism is placed loosely in the mouth, it may be fairly rigidly secured to mouthpiece 21 by placing a film of water between prism 74 and either mouthpiece 21 or sleeve 80 thereover, and then pressing prism 74 firmly against mouthpiece 21. There are multiple advantages to providing the prism separate from mouthpiece 21, including (1) the ability to sterilize prism 74 even though mouthpiece 21 is not sterilized, (2) the ability to use sanitary sleeve 80 to be described in more detail hereinafter, and (3) the ability either to select prisms of different sizes and shapes or to adjust a flexible prism to fit different mouth sizes and shapes for the comfort of the patient and for securing better photographs.

Prism 74 can be made flexible to accommodate various arch widths.

After prism 74 is placed against the teeth in the manner shown in FIG. 1, camera 20 is used as usual. The resulting picture shows the crowns of the teeth; a nearly complete view of the vestibular, labial and buccal outside surfaces of the teeth as reflected through the horseshoe-shaped prism 74; and a highly-foreshortened view of the inner or oral surfaces of the teeth due to the perspective of the lens. Although the image of the vestibular, labial and buccal surfaces of the teeth is somewhat distorted due to the change in curvature of the reflecting surfaces, this distortion can be eliminated when viewing the finished photograph by viewing this photograph through this same prism to get a true, undistorted mirror image of the front and sides of the teeth.

As brought out in more detail heretofore, mouthpiece 21 is relatively wide and flat so as to be adapted to be received between the occlusal surfaces of the subject being photographed. Also, mouthpiece 21 has picture taking window 23 in FIGS. 19 and 21 on one side thereof adapted to face and abut one of these occlusal surfaces. These structural features lead to other methods of use of the mouthpiece brought out in more detail hereinafter. Resilient rubber or plastic pad 79 is cemented to the top of mouthpiece 21 to be carried thereby on the side opposite window 23. This permits the opposing teeth to bite into and to clamp onto pad 79 to hold camera 20 steady during picture taking of the occlusal surface.

Periscope 40, being flat, and its enclosing mouthpiece 21 can be easily inserted into the mouth, and can be protected from contamination by means of disposable, plastic, fog resisting, transparent sheet member or sleeve 80 telescopically receivable over mouthpiece 21 and having a transparent portion at least coextensive with window 23 serving as the dental camera lens. Then, each subject photographed may use an individual and sanitary sleeve 80 while his teeth are being photographed, and it is not necessary to sterilize mouthpiece 21 after each usage. Sleeve 80 is slightly tapered in one or both directions, and mouthpiece 21 is correspondingly tapered. Pulling sleeve 80 on over the taper stretches it out to a smooth, snug fit free of wrinkles over transparent window 23. The taper frictionally locks sleeve 80 on mouthpiece 21 but permits easy removal therefrom and assures a clear photo.

Figure 16:
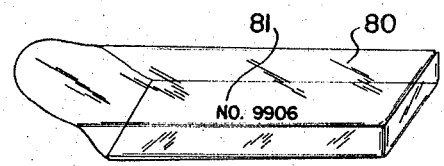
FIG. 16 is a perspective view of a transparent, hygienic mouthpiece sleeve.
Figure 18:
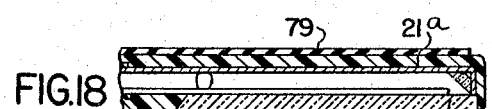
FIG. 18 is a longitudinal, vertical, sectional view taken through the mouthpiece in FIG. 15.
Figure 19:
FIG. 19 is a transverse, sectional view taken through the mouthpiece in FIG. 15 with the sleeve in FIG. 16 mounted thereon.
Figure 17:
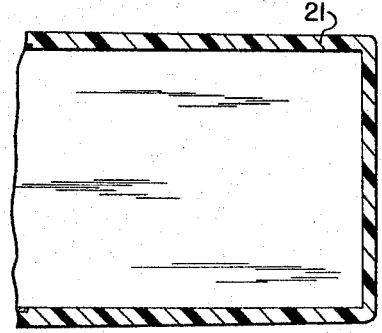
FIG. 17 is a horizontal, sectional view taken through the mouthpiece in FIG. 15 with the periscope removed.

Suitable indicia 81 in FIG. 16 may be carried by sleeve 80 and will be automatically photographed to appear on finished film 30 in FIG. 2. Suitable indicia 81 may include the identifying number of the patient and either a trademark of the sleeve or camera or a servicemark of this service provided.

An anti-fogging agent or solution can be sprayed on the outer surface of sleeve 80 in precise quantity at the factory on only the side covering window 23. This saves the messy hand operation of applying this solution before taking each picture. Suitable materials are ethylene glycol, alkyl aryl polyether, or Kodak Photo Flo wetting agent. Only a minute trace of this solution is needed. Only enough need be applied to provide the anti-fogging action but not too much should be applied so as to leave an objectionable taste in the mouth of the patient. Fogging may also be prevented by running warm water over mouthpiece 21 to warm it.

Sleeve 80 may be constructed to provide a suitable light filtering action, and such filter may alternatively be used between lamps 44 and collimating lens 45, either as earlier described or as described hereinafter. There are two filter possibilities. First, sleeve 80 may be green in color to serve as a green filter to darken the gum tissue in the camera photograph to provide more contrast with the white teeth. Second, two different sleeves 80 may be provided with each having a different filter factor. Since the action of periscope 40 moving in scan direction S provides an approximately uniform photographic exposure time for each picture, proper selection of these two different filter factors complimentary to the speeds of the film used, such as black and white film and color film, will permit the use of one sleeve with one film and the other sleeve with the other film. Then, approximately the same exposure time will be required for both films, even though one film speed may be faster than the other, so that both films will be compatible with this uniform exposure time. This is explained in more detail in the next paragraph.

Conventional cameras are able to adapt to great variations in light intensity and in range of film emulsion speeds. This is usually accomplished with the familiar variable speed shutter and iris diaphragm, both complicated mechanisms. On dental camera 20, a much simpler method can be used to accommodate films of widely varying emulsion speeds, for example, a slow color film and a fast black and white film. It works in this manner. For the slow color film, disposable sleeve 80 is made of *clear* plastic. Then, for a fast black and white film, the sleeve is made of *colored* plastic of such density as to reduce the light transmission to the approximate amount for correct exposure. Small adjustments in exposure can be made if necessary with either scan-speed rheostate 60 or light rheostate 59. The color of the sleeve is preferably green or blue-green so as to selectively darken the image of the *red* tissue to give greater contrast with the white teeth. This works on the same principle as colored lens filters on conventional cameras. In actual practice, only two varieties of sleeve are needed: the clear one for color film, and one shade (density) of blue-green for the particular speed black and white film to be used. The basic camera must, of course, be designed to work with the slower of the two films.

The mode of operation of the camera in FIGS. 20-23 should be readily apparent. To load camera 20 with film 30, its latch is unlatched, back 26 is swung open on its hinge, film 30 is inserted, and back 26 is swung and latched closed. Then, control button 58s is actuated to run periscope 40 back to its starting position in direction R if switch 58 is not spring biased into this position. Disposable sanitary sleeve 80 is pulled over mouthpiece 21. The anti-fogging agent can be applied either at this time or when the sleeve was originally manufactured. Prism 74, 75 or 76 or mirror means 76 may now be attached. Mouthpiece 21 is inserted into the subject's mouth and placed in contact with the crowns of the teeth in the occlusal plane. The subject can help hold mouthpiece 21 immobile by lightly squeezing mouthpiece 21 with the opposing teeth gripping pad 79 enabling the teeth to better grip it without undue pressure. Motor control button 58s is pressed and held for approximaely one second, or any suitable time that the exposure requires. Then, motor 50 pulls shutter 70 to open shutter aperture 70f and then to pull periscope 40 in scan direction S to bring the image of object 24 piecemeal to film 30 by a line scanning process, and to terminate exposure of film 30 by overriding mask 65. The sound of motor 50, as well as the feeling through the body of camera 20, tells when periscope 40 has finished its travel. The camera is then taken from the mouth, film 30 is advanced to the next exposure in any suitable manner, camera 20 is turned over to photograph the other set of teeth, and another exposure is made by repeating the above procedure.

Although the description in the preceding paragraphs of the component parts, structure, mode of operation and advantages has been given for FIGS. 1–30, it will be apparent hereinafter that this same description applies generically to the corresponding named component parts in all forms of the invention in FIGS. 31–45, except in the 100 or 200 series. The structural difference between the different forms and modifications in FIGS. 1–45 will be brought out hereinafter.

Films 30 and 130 may take many different forms. Each may be a Polaroid film, a film pack, or a roll film. If either of the latter two are used, all of the exposures would be taken and then the film would be dark-room processed in the usual manner. Contact prints would be made to get a life-size picture of the teeth. Film 30 in FIG. 21 is a Polaroid 3¼ x 4¼ inch film pack type 107 pressed into place by leaf spring 29a and abutting against stop guide 29b. A 3⅛ x 4¼ inch film pack is considerably smaller and would allow a more compact camera design. Paper tabs are suitably provided for pulling out the Polaroid picture past tab guide 29b. Processing rollers 31 are provided to crush the pod of developing chemicals and to squeeze the negative and print together during the Polaroid developing process. These conventionally develop outside the camera in 10 seconds for black and white film and 60 seconds for color with presently available materials. Some of the Land Polaroid process is described in U.S. Patent Nos. 2,543,181 and 2,662,822, which process in itself constitutes no part of this invention although the use of it is applicable to this camera.

A smaller version of the camera described in FIGS. 1–30 is suitable for use with children. It uses a standard size 2¼ x 3¼ inch film pack.

Film 130 has spools 131a and 131b but could be cassettes as used in 35 mm. cameras. Here, the film is completely wound in film supply spool 131a with the emulsion side out, is advanced from right to left during the picture taking process by being guided by smoothly polished winding guide 131c pushing the film into film take-up spool 131b slidable into one side of guide 131c and is re-wound into spool 131a after all exposures have been made so that the film can then be sent out for processing. If desired, a roll film cartridge can be physically inserted into the camera in this type design.

Figure 14:
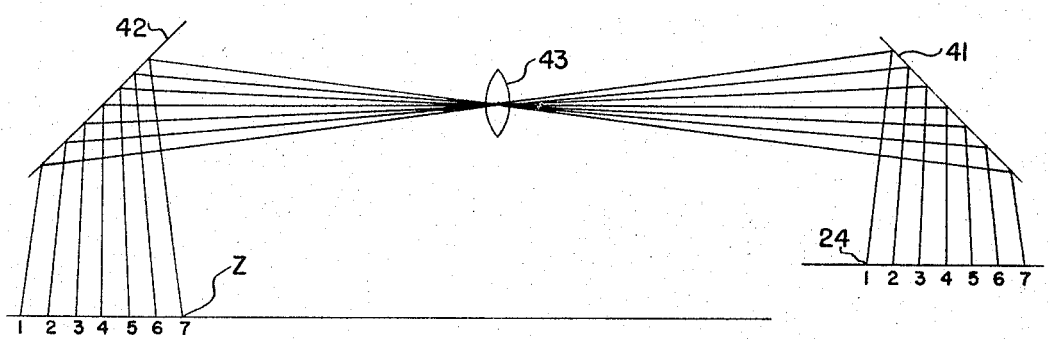
FIG. 14 is a schematic, optical diagram of the optics involved in the first form of camera shown in FIGS. 20–30, inclusive.
Figure 15:
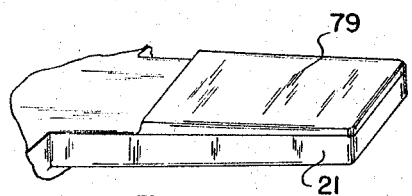
FIG. 15 is a perspective view of the mouthpiece of the camera without the mouthpiece sleeve in FIGS. 1 and 16.

The next new paragraph will discuss the optical theory not only generic to but also specific to each of the two different camera forms in FIGS. 20–28 and FIGS. 31–37 as portrayed in FIGS. 14 and 38.

Now, let us consider FIGS. 13, 14, and 20–23. Since both ends of periscope 40 travel the same distance, the length of the picture on film 30 will be the same as the length of object 24, i.e., the picture will be full size. In order for image Z of object 24 in FIG. 13 be delivered to film 30 without "smear" (that is, without relative motion of image Z to film 30), camera lens 43 must necessarily give a one-to-one ratio between the size of object 24 and the size of image Z on film 30. To accomplish this, lens 43 is put midway between the object and the image. This is according to well understood principles of optics. Here, it is put in the center of periscope 40. To scan without smear, the image must also be erect. In other words, you can't scan from top to bottom with an upside down image. Since the lens inverts the image (and you must have the lens in order to *have* an image), it is erected in my construction by having two periscope mirrors (or prisms) 41 and 42 face the same direction. This is, in effect, two inversions which offset each other. (A person familiar with optics might say that a mirror doesn't invert an image, but instead reverts it. This is familiar to anyone who has ever looked in a mirror. In the instant case, it is *called* an inversion, instead of reversion, because it makes the picture upside down in *relation to the direction of scan*.) The lens also "reverts" the image (changes left for right). This is necessary as the "printing" step of the photographic process will revert the image and put the picture back into its proper relationship. This is true of the presently used Polaroid process as well as the conventional negative film and paper positive printing process.

The focal length of lens 43 may be calculated. One well known equation of classical optics is:

$$\frac{\text{height of object}}{\text{height of image}} = \frac{\text{distance of object from lens}}{\text{distance of image from lens}}$$

Hence, it is obvious that, for a 1 to 1 size relationship of image Z to object 24 (or unit magnification), the *lens must be half way between object 24 and image Z*. In this camera, lens 43 must be midway between the object and the film. The "Gauss formula" of classical optics states that for a *thin lens*:

$$\frac{1}{\text{focal length}} = \frac{1}{\text{object distance}} + \frac{1}{\text{image distance}}$$

or $$\frac{1}{\text{f.l.}} = \frac{1}{u} + \frac{1}{v}$$

(where $u$ and $v$ are the respective distance). But in this case (of unit magnification) $u=v$ so that $$1/\text{f.l.} = 2/u \text{ or } \text{f.l.} = u/2$$

So the focal length of the lens must be one-half the distance to the object, or it may be more conveniently expressed as:

$$\text{f.l.} = \text{total distance}/4$$

Since $$\text{total distance} = u+v$$

and since $$\tfrac{1}{2}\,u = \tfrac{1}{4}\,(u+v)$$

The total scanning time can be calculated for lens 43. The lens in this dental camera acts just like the lens in any camera except for these conditions:

(1) The field of view is sharply limited by the walls periscope 40 and the size of mirrors (or prisms) 41 and 42.
(2) The "lens speed," or $f$ number, is considerably reduced as the object is brought close to the lens, and this reduction must be allowed for according to well known optical principles.

Under condition No. 1 above, the strip (or line image Y on film 30 produced by scanning periscope 40 will be just as bright as if the lens had an unrestricted field of view. It is just that the rest of the film is dark. So any particular exposure time that would give a good picture with a stationary lens would correctly expose the strip if the periscope didn't move. Then, the total scan time would be:

$$\frac{\text{length of scan } S}{\text{width of image strip } Y} \times \text{exposure time for a still picture}$$

In my particular design, this is $$2.75''/.187'' = 14.7 \text{ times the exposure required for a still picture}$$

Since the $f$ system for calculating lens speed works accurately only at infinity, the *effective f* value must be calculated to compensate for any substantially different exposure distance. Under condition No. 2 above, the effective $f$ value of the lens, at which the lens will be working, is found by the well known "copying correction" equation:

Effective $f$ value=
$$\frac{\text{indicated } f \text{ value} \times \text{lens-to-film distance}}{\text{focal length}}$$

where indicated $f$ value=lens aperture/lens focal length

In this invention, where the image must be the same size as the object:

$$\text{Effective } f \text{ value} = \frac{\text{Indicated } f \times 2 \times \text{focal fength}}{\text{focal length}}$$

because $u=v=2$ f.l. Hence,

Effective $f$ value=$2 \times$ indicated $f$ value

So the lens will be only half as fast as it would be in normal photography. Fortunately, this poses no problem in this application.

The lens is preferably designed to focus more sharply on object 24 located in a plane about ⅛ inch from the outer surface of transparent window 23 with the aperture in lens mask 34 used with lens 43. Then, there is usable sharpness focus from the surface of window 23 to about ¾ inch away from window 23. The following calculations try to find the point on which to focus when all parts of the object are not in the same plane. A well known optical formula is:

$$\text{Best distance to focus} = \frac{2a \times b}{a+b}$$

where $a$=distance from lens to nearest object
$b$=distance from lens to farthest object In this particular camera (where object and image are the same size, the "best distance to focus" on must be $2 \times$ f.l. of the lens. Also in this particular camera, the $a$ distance is from the lens to the *outside* of the window. The $b$ distance is $a+.2$ inch (or $a+5$ mm.) considering the average roughness of the crowns of adult teeth. However, when considering the use of the prisms 74, 75 or 76 or mirror means 77, the $b$ distance is $a+.5$ inch or ($a+12$ mm.). With a lens of known focal length and the particular $a$ and $b$ distances mentioned above, the formula becomes a quadratic equation with one of the solutions thereto giving the answer to the problem.

Camera 20 in FIG. 20–23 has structure and modes of operation not described in detail heretofore. Camera housing 27a, preferably formed of an aluminum die casting separate from top cover 27b, and mouthpiece 21 are preferably formed as one integral piece of molded plastic, but are also formable of metal. Although the outside of the camera could be covered with simulated leather to provide a desirable appearance, it is preferably formed of smooth metal for ease in keeping it sanitary. Back 26 is hinged to the camera to allow the Polaroid pictures to be pulled out. For a camera using regular film, back 26 and housing 27a could be one solid part. In FIGS. 22 and 23, guides 27d, integrally formed with top cover 27b, carry pins 71, taking the form of two headless screws, projecting from opposite sides of periscope 40 to carry and guide the inboard end of periscope 40, to hold sliding shutter 70 onto periscope 40, and to limit the sliding motion of shutter 70 relative to periscope 40 to the desired amount, and to hold shutter 70 and periscope 40 in proper relationship to film 30 during the scanning motion in scanning direction S.

Figure 27:
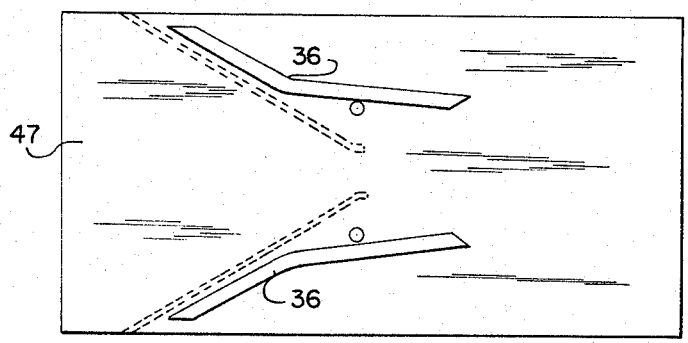
Figure 28:
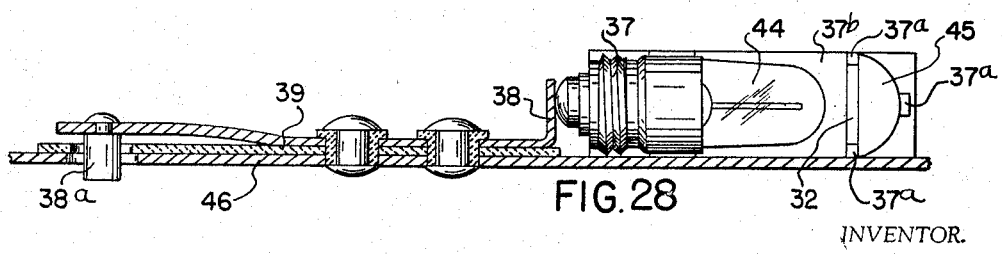
FIG. 28 is a vertical sectional view taken generally along the line 28—28 in FIG. 26 through one of the lamps and its collimating lens.

It has been found that an operative camera 20 may be constructed with the dimensions disclosed herein heretofore and in this paragraph. Camera lens 43 is cemented into place in periscope 40 in FIG. 26, is ³⁄₁₆ by ⁵⁄₁₆ inch and has a 36 mm. focal length. There is a 4.8 inch center to center distance between mirrors 41 and 42, a 0.343 inch vertical distance below mirror 41 to object 24, a 0.525 inch vertical distance from mirror 42 to film 30 in FIG. 21 and a 5.668 inch distance for the total light beam length (or about four times the focal length of the 36 mm. lens). Note that lens 43 is slightly to the left of center in periscope 40 in FIG. 26 because film 30 is slightly lower in the camera than the object plane in FIG. 21; this lens offset keeps the light path equal on both front and rear of lens 43. Bottom cover 47 in FIG. 27 is formed of 0.010 inch thick steel. Each lamp 44 is a G.E. Co. No. 329 bulb and each collimating lens 45 has a 3 mm. focal length. Film 30 is Polaroid "ten second" black and white self-developing 3¼ x 4¼ inch film having an emulsion of A.S.A. 3000. Lens mask 34 provides a lens aperture of $f13.6$. Although the focal length of lens 43 is 35 mm., the thick flat glass transparent window 23 in front of lens 43 has the effect of increasing the focal length to 36 mm. The usual scan time in scan direction S is 1.2 seconds and the scan length is approximately 2¾ inches. Two lamps 44 have a combined light output of approximately 1.3 candle power. These parameters have been found to give a correct exposure when a cellophane sleeve 80 is used, and to give a slight over exposure if camera 20 is used without sleeve 80.

The 35 mm. camera 120 in FIGS. 31–37 will now be discussed in some detail.

For some purposes, it would be highly desirable to be able to take pictures of people's teeth on 35 mm., side-perforated film 130, which records an image substantially reduced in size from that obtained on film 30 in camera 20 in FIGS. 20–23. The picture taken is essentially the same as with dental camera 20 except that the photo would be of a reduced size, preferably ⅓ of the actual size.

In taking large numbers of pictures for a permanent record, the reduced bulk of the 35 mm. film is an advantage. It is also more convenient to have a long, continuous strip film in the camera than to have to reload film packs frequently.

Typical applications for this model of camera would be in making dental records of large numbers of school children or members of the armed forces. The full-sized camera 20, in contrast, would be more suitable for the individual practicing dentist.

The principles described here, and earlier in this specification in describing the optical theory involved, in making the photo in reduced size on 35 mm. film would of course apply equally to any other film size or to any other degree of reduction, for example, 16 mm. movie film.

Some of the incidental advantages of using a reduced image size are:

(1) The perspective is more nearly orthographic because the lens is farther from the object for any given length of periscope.
(2) The "apparent $f$ speed" of a given diameter lens is greater. This is because the light available for taking the picture is concentrated on an area of $1/n^2$ as large as the full size image. This is well understood in the camera art.
(3) The external size and weight of the camera are considerably reduced because of smaller film 130.

FIGS. 31–37 contain structure and modes of operation not described in detail before. Camera body 127 comprises an integral camera housing 127a and top cover 127b made of molded plastic, but could be made of metal. Periscope 140 works just like periscope 40 on dental camera 20 except that it reduces the size of the image on film 130 because photographic lens 143 is closer to the film end. Two, facing, suitable grooves 127d are provided in camera housing 127 to guide the opposite lateral sides of periscope 140.

Now, let us discuss lens 143 in FIGS. 41–45. Here, film 130 is a 35 mm. film so some reduction in image size thereon must be obtained, and this reduction changes the optics of this system. Lens 143 is not in the center of the light path, but is located closer to film 130 by the exact amount so as to give exactly the size reduction required. The lens location is according to the following well-known optical formula:

$$\frac{\text{lens-to-object distance}}{\text{lens-to-film distance}} = \frac{\text{height of object}}{\text{height of image}} = n$$

wherein a size reduction of $n$ times occurs. Also, the lens is located along the light path relative to the film $1/n$ the distance from the lens to the object.

For the normal adult-size dental arch, a three to one reduction give a proper size image to fill a 35 mm. film. Hence, the object to image on the film size is three to one in camera 120 in FIGS. 31–35 and one to one in camera 20 in FIGS. 20–27.

Referring to drawing FIGS. 31–37, it can be seen that this scanning camera and picture taking method presents certain problems not found in most cameras. There is no difference as far as the width of the picture is concerned. Periscope 140 "sees" the full width of object 24, lens 143 reduces it the designed amount and periscope 140 delivers it to film 130 in a similar manner.

On the other hand, the height of the object (in this case, the front-to-back of the mouth) must be handled differently. Periscope 140, in line scanning the object, must move over the entire length of object 24 (height of the picture). Being of solid construction (i.e., not extensible), periscope 140 will deliver the image along this same length, just as it does in the full-sized-image camera 20 in FIGS. 20–28. However, the image in camera 120 is of reduced height so that this results in a "smear" of the image along the surface of film 130 in scan direction S. In this invention, the moving image is "caught" by moving film 130 so that the relative speed between the film and image is zero. For example, if lens 143 reduces the image to ⅓ size, then film 130 must move ⅔ of the distance that periscope 140 moves Periscope 140 thus over-runs film 130 by the remaining ⅓, and in doing so, it delivers scanned image Y to film 130 along this distance. In the general case of a size reduction of $n$ times, the film should advance $$\frac{n-1}{n}$$

of the scan distance during the film exposure.

Film 130, a 35 mm. side-perforated film, is fed from spool 131a to spool 131b over film track 182 in FIG. 36 locating and guiding the film in the horizontal plane. Film track 182 has two parallel slightly raised edges 182a to guide the film in the vertical plane and has two parallel grooves 182b under the perforations 130a in the film to provide clearance for driving teeth 183a on film traverse frame 183. These driving teeth 183a engage holes 130a in the film to move film 130 in scan direction S during picture taking and in reset or reverse direction R during resetting the film. Film traverse frame 183 is slidably carried at one end by two, coaxial rods 187a telescoped into opposite ends of a hole in frame 183 having their outer ends traveling in parallel grooves 127f in the camera housing 127 and guided at the other end by leaf spring 188 secured at its middle to frame 183 and having its distal ends riding in these same grooves 127f so that spring 188 presses frame 183 and teeth 183a against film 130.

The film is driven in scanning direction S in this manner to avoid image "smear." The proper motion relationship is effected by interconnecting periscope 140 with film traverse frame 183. This is done with a simple, second class lever 184 on each side of frame 183. Each lever includes rod 186 telescopically connected within sleeve 185 and pivot sleeve 187 on each side of film 130. Bottom end of sleeve 185 is connected by pivot 185a to film track 182 secured by screws 182a to film housing 127, and the top of rod 186 is connected by pivot 186a to periscope 140. Hence, each lever 184 is made to telescope so that its length may change during its swing. Film traverse frame 183 is slidably and pivotally connected by a through bore to coaxial rods 187a at the proper distance from the pivot 186a to give the desired proportional motion. Together, sleeve 185, sleeve 187 and rod 186 in each lever 184 form a "proportioning lever" system to connect the motions of film 130 and periscope 140 in proper ratio because the distance between pivots 186a and 187a is one-half the distance between pivots 185a and 187a along the length of each lever 184.

Lever 184 is provided on each side of film traverse frame 183 so that the forces about the longitudinal center line of film 130 are balanced. The motion of levers 184 is theoretically perfect, and any slight working clearances between the parts is all taken up in one direction during the exposure. Rod 186 telescopes inside sleeves 185 and 187 to permit lever 184 to change in length during its arcuate swing.

Each pivot sleeve 187 in FIG. 37 is rigidly connected with its associated rod 187a and has through hole 187b telescoped over rod 186. This part 187, 187a does three things:

(1) Pivot sleeve 187 slides on rod 186 in proportioning lever 184 to pick-up its motion, and
(2) Provides a pivot for film traverse frame 183 to rotate about, as will be more apparent during the description of the reset movement of film 130 in return direction R, and has coaxial rods 187a providing a guide in a horizontal plane in grooves 127f for film traverse.

A long strip of film 130 is arranged for supply and take-up on two spools 131a and 131b, as is common in cameras. Film 130 is situated so that its length is along scan axis S of periscope 140. This is so that film traverse frame 183 can perform the dual functions of advancing film 130 after exposure in reset direction R, as will be described in more detail hereafter, as well as moving it in scan direction S to catch the moving image. Film traverse frame 183 pulls film 130 from supply spool 131a and pushes it onto take-up spool 131b in the same continuous motion during the exposure.

Other types of proportional mechanisms can be used in place of levers 184 but are not shown. One suitable type has two gears (not shown) bearing the ratio $n-1$ to $n$ rigidity connected together and rotatable on the same shaft secured to housing 127 approximately at the midpoint of lever 184 in FIG. 31 with the axis of the shaft extending traverse to film 130. The larger gear meshes with a rack attached to periscope 140, and the smaller gear meshes with a rack on film traverse frame 183 with each rack extending in scan direction S. Sliding movement of periscope 140 in scan direction S rotates the gears and drives film traverse frame 183 at the proper relative speed to catch the image and prevent "smear". Alternatively, drums and cables (not shown) could be substituted for the gears and racks described.

As periscope 140 is reset back to the starting point by movement in reverse direction R, film 130 too must be moved back or returned by the distance $$\frac{n-2}{n}$$

(where $n$ is the ratio of reduction as before) at the end of the scan to position the film for the next exposure scan. This is another way of saying that the exposed portion of the film should be "advanced" before the unexposed part is moved back to the starting position. The process is like "two steps forward and one step backward." However, if the ratio of reduction is two or less, the film does not have to be moved backwards at all.

The above described "moving-back of-the-film" is accomplished in this camera in this manner. As film traverse frame 183 moves in scan direction S, cam surfaces 183b on opposite sides thereof ride over pawls 189 coaxially and pivotally conected by pivot 189a on opposite sides of film track 182 to overcome two torsion springs, one biasing each pawl 189 in the clockwise direction in FIG. 36 about its pivot 189a against abutment stop 182c on frame 182. Hence, pawls 189 swing freely to the left and allow film traverse frame 183 to slide over them. During reset movement in reverse direction R, a different action takes place. As film traverse frame 183 moves in direction R, cam surfaces 183b ride up over "one-way" pawls 189 on the return stroke because the torsion springs swing pawls 189 clockwise in FIG. 36 against abutment or stop 182c on film track 182 to prevent them from swinging to the right. This action tips the left end of film traverse frame 183 in FIGS. 31 and 37 upwardly a little in the clockwise direction so as to release driving teeth 183a from film perforations 130a in film 130 and film 130 is not moved. There is sufficient drag in film rolls 131a, 131b so that frame 183 cannot frictionally drag the film now. Cam surfaces 183b are made exactly as long as the part of the film that has been exposed in one shot, so that this part of the return stroke R is "skipped." Then, as traverse frame 183 comes into contact with film 130 at the proper place, driving teeth 183a reengage holes 130a in film 130 at the proper place and drag film 130 in reset direction R to the starting point. The torsion springs, acting on pawls 189, hold each lightly against its stop 182c so that the camera works equally well in the inverted position. Leaf spring 188 holds the left end of film traverse frame 183 in FIGS. 31 and 37 against film 130, allows it to pivot up and down over pawls 189 and yet not fall away from film 130 when camera 120 is inverted. Driving teeth 183a engage holds 130a in film to give the "two steps forward" during movement in scan direction S and "one step backward" during reset in reverse direction R. Rectangular framing hold 183c in frame 183 also forms a mask to define the border of the picture taken on film 130.

For a 35 mm. film and a three to one size reduction, the image is 0.833 inch wide for a 2½ inch wide periscope 140. It is 0.916 inch long when the scan length is 2¾ inches so the film advances 1.834 inch in scan direction S during exposure, and retracts 0.916 inch during reset in direction R.

I have found that the camera 120 will work with the following operating conditions prevailing: Film speed of ASA 1200, f12.9 aperture in lens mask 134, focal length of lens 143 being 25 mm. (this is shorter because of the more compact arrangement of parts in this camera), scan time of 1.2 seconds, scan length of about 2¾ inches, and illumination by lamps 144 of 1.3 candle power.

If desired, a film exposure counter of any suitable type (not shown) can be used. It can work off the oscillation motion of either lever 184 with its indicating dial showing on the outside of camera housing 127 the number of times the film has been "traversed" in scan direction S. This presumably would be the accumulated number of exposures made. With a film of known length, the number of available exposures left could be determined. This is the system used today on all 35 mm. miniature cameras.

Camera 120 in FIGS. 31-37 successfully operates because it delivers to film 130 an image of object 24 having substantially equal increments of light on equal areas of film 130 throughout the scan. This basic principle of operation was described for camera 20 wherein lamps 44 had a substantially steady and unvarying illumination and motor 50 had a constant speed.

Although camera 120 has been described with a three to one size reduction, it should be readily apparent that cameras of different size reductions can be built by using the same principles. A practical camera may be built with as much as a six to one size reduction.

The structures in FIGS. 39-45 present modifications of this basic principle of operation of delivering substantially equal increments of light on equal areas of film 30 or 130 during scan S. Here, we have either (1) a variable (non-uniform) speed motor, operating within the broad definition of the motor broadly described before, driving periscope 40 by a consistent speed pattern throughout scan S so that illumination must be varied in intensity as a function of the speed of the motor or location of light beam in said scan so that the image of object 24 will have substantially equal increments of light delivered on equal areas of film 30 throughout scan S in spite of the non-uniform speed, (this is assuming that, of course, the object is also of an even intensity, similar to a white sheet of paper), so that the photo will have an even density along the length of scan; or (2) a substantially constant speed motor and a substantially steady and unvarying illumination.

To accomplish either of these desired modes of operation, any of these three following different modes of operation and variations in structure could be used.

First, a relatively constant scanning speed with steady, unvarying illumination can be obtained by means of:

(1) An electric motor having a constant drive speed, such as motor 50 in FIG. 31;
(2) Two springs 201, either tension or compression but shown in FIGS. 42 and 43 as compression springs, pivotally anchored at opposite ends to periscope 40 or 140 and camera housing 27 or 127 pushing or pulling, as spring drives or a spring-type driving motor, periscope member 40 toward the left in scan direction S with the speed of movement controlled by straight rack 202, riveted to periscope 40, meshing with and engagable by two pins 204a on oscillating pawl, pallet or bob weight escapement 204 pivotally connected to camera housing 27 by central shaft 204b and movable in an oscillatory direction, as shown by the arrows in FIG. 42, to allow one notch of rack 202 to escape per oscillation cycle by the slope of the teeth on rack 202 driving pins 204a;
(3) A hydraulic cylinder escapement (not shown) used with similarly mounted springs 201 in FIG. 40;
(4) A spring and windmill (a paddle rotated in the air to provide constant speed by a high power absorption curve) escapement (not shown);
(5) A spring and an eddy current retarder (not shown) consisting of magnets acting directly on the metal of the periscope;
(6) A spring (not shown) of the "negator" type (a spiral spring with a changing force or set along its length) used in connection with the escapements of (2), (3), (4) or (5) above; or
(7) A pull string serving as a manually controlled driving force depending on the skill of the operator to be consistent and correct.

Second, periscope 40 or 140 can be simply accelerated with a simple spring arrangement. A more constant spring force can be obtained with the "canted" arrangement of springs 201 on FIG. 40 than with any straight helical spring mountings; canted springs give a variable spring rate. The effect of the spring force varying the speed of the periscope on the exposure time can then be compensated for by either of two ways. First, periscope 40 or 140 may vary the illumination throughout the length of scan S by varying the voltage to lamps 44 or 144 on the basis of the position of the periscope along the length of travel of scan S. This compensates for variations in scan speed by using a wire wound or carbon, variable resistance 207 in the energizing circuit of lamps 44 or 144, changeable in resistance as a function of location of periscope 40. Resistance 207 has its left end secured to housing 27 and is energized through sliding contact 208a on camera housing 27 engaging periscope 40 in FIG. 44 and sliding contact 208b in FIG. 45 slidably engaging the surface of resistance coil 207 so that each makes sliding contact in the inlet and outlet sides of the circuit to the lamps. Second, filter 209 in FIG. 40, consisting of sheet plastic, is located between film 30 or 130 and the inboard end of periscope 40 or 140 and has a variable density along the length of scan travel. Then, the illumination of lamps 44 or 144 can be constant but filter 209 offsets the effect of the changing photographic exposure due to variations in scan speed.

Filter 209 is made in a novel manner. To get the exact variation in density needed to compensate for the acceleration of the scanning periscope, this filter is made photographically in the camera itself. A negative is exposed in camera 20 to an object having an even "white background," or by using another constant light source, by using the variable speed spring drive with this negative intercepting the scanned light beam over film 30. Then, the negative is developed to a suitable density so that one end is clear, as shown at the left in FIG. 31. This negative then becomes filter 209 and is installed in the camera over film 30 or 130 in the manner shown in FIG. 39. Its transparency is the exact reciprocal of the light distribution and will thus compensate for all repeatable variations by the variation in scanning speed. It should be apparent that this variable density filter can be used in any camera (transmitting non-uniform illumination from a constant light source) to give uniform light distribution and can be made by any shutter, instead of periscope 40.

It should be apparent that this filter can be interchangeable with lighter or darker ones for films of different sensitivities.

Third, periscope 40 or 140 can be driven by a motor including a dash pot speed control driven by springs 201 shown in FIG. 40, but held back by the vacuum formed by the periscope being telescopically slidably withdrawn from its snugly fitting, flat mouthpiece 21 or 121 and through its frictionally surrounding light trap 25 or 125. Periscope motion in return direction R would be suitably held back by air pressure in the same manner. An air bleed hole (not shown) in the mouthpiece would allow suitable speed control of this motion. This arrangement requires no additional parts to perform the function.

Any of the above structures that do not give a constant scanning speed would have to be used either with a film of wide latitude or with one of the compensating devices mentioned in the item entitled "second" above.

The invention may be embodied in other specific forms without departing from the spirit or essential characteristics thereof. The present embodiments are therefore to be considered in all respects as illustrative and not restrictive with the scope of the invention being indicated by the appended claims rather than by the aforegoing description, and all changes which come within the meaning and range of equivalency of the claims are therefore intended to be embraced therein.

What is claimed and desired to be secured by U.S. Letters Patent is:

1. A camera for bringing the image of teeth from a human mouth, comprising
    a film carrier associated with the teeth being photographed, and
    means for scanning across the occlusal surface of the teeth in the upper or lower jaw during picture taking to impose the scanned image of this surface of such teeth on the film,
    said teeth having not only said occlusal surface but also vestibular, labial and buccal outside and oral inside surfaces, and
    light deviating means for deviating a beam of light containing the image of one of said side surfaces from a plane of said one side surface for said teeth into the plane of said occlusal surface so that said camera can simultaneously photograph said occlusal and said last mentioned side surface on said film.

2. A camera, as set forth in claim 1, with
said light deviating means being a mirror means.

3. A camera, set forth in claim 1, with
said light deviating means being a prism means.

4. A camera, set forth in claim 3, with
said prism means having an angular, segmented surface facing and opposite said last mentioned side surface and extending generally parallel to said occlusal surface.

5. A camera, set forth in claim 3, with
said prism means having a horseshoe-shaped curved surface opposite and facing said last mentioned side surface and extending generally parallel to said occlusal surface.

6. A camera, as set forth in claim 3, with
said prism means having a horseshoe-shaped curved surface facing and an angular, segmented surface opposite said last mentioned side surface and extending generally parallel to said occlusal surface.

7. A camera for photographing human teeth, comprising
    a relatively wide and flat mouthpiece adapted to be received between the occlusal surfaces of the subject being photographed,
    said mouthpiece having a picture taking window on one side thereof adapted to face and abut one of said occlusal surfaces,
    a resilient pad carried by said mouthpiece on the side opposite said window,
    so that the opposing teeth can clamp on said pad and said window of said mouthpiece to hold the camera steady during picture taking of said occlusal surface.

8. A camera for photographing human teeth, comprising
    a relatively wide and flat mouthpiece adapted to be received between the occlusal surfaces of the subject being photographed,
    said mouthpiece having a picture taking window on one side thereof adapted to face and abut one of said occlusal surfaces,
    a sleeve telescopically receivable over said mouthpiece and having a transparent portion at least coextensive with said window,
    so that each subject photographed may use an individual and sanitary sleeve while his teeth are being photographed.

9. A camera, as set forth in claim 8, with
corresponding tapers on said mouthpiece and sleeve to stretch the sleeve tight against the window for a clear photograph and to permit easy removal therefrom.

10. A camera, as set forth in claim 8, with
a teeth-photograph identifying number on said sleeve to identify the subject being photographed by having the number photographed on the camera film.

11. A camera, as set forth in claim 8 with
said sleeve being green in color to serve as a green filter to darken the gum tissue in the camera photograph to provide more contrast with the white teeth.

12. A camera, as set forth in claim 8, with
a photographic means having an approximately uniform photographic exposure time for each picture, and
a choice of two sleeves being provided,
one of said sleeves having one filter factor in said transparent portion and another of said sleeves having another filter factor in said transparent portion,
said filter factors being selected complementary to the speeds of black and white film and color film, so that use of one of said sleeves and black and white film will require approximately the same exposure time as use of the other of said sleeves and color film, whereby both films will be compatible with said uniform exposure time.

13. A camera for bringing an image for a picture out of a relatively inaccessible place or cavity, like bringing the image of teeth from a human mouth, comprising
   a film carrier located outside said cavity,
   means for bringing the image out of said cavity piecemeal by line scanning onto the film on said carrier during picture taking,
   a lens for forming the image of said object on said film,
   a lens carrier carrying said lens and having relative movement with respect to said object and film for providing said line scanning,
   said lens being a fixed focus lens having an exposure aperture of fixed size.

14. A camera for bringing an image for a picture out of a relatively inaccessible place or cavity, like bringing the image of teeth from a human mouth, comprising
   a film carrier located outside said cavity,
   means for bringing the image out of said cavity piecemeal by line scanning onto the film on said carrier during picture taking,
   a lens for forming the image of said object on said film,
   a lens carrier carrying said lens and having relative movement with respect to said object and film for providing said line scanning,
   said lens being a fixed focus lens having an exposure aperture of fixed size,
   two light beam deviating means on said carrier straddling said lens and facing said lens and respectively facing associated object and film with both the film and object being located on the same side of the axis of the lens and with the lens located along the light path relative to the film $1/n$ the distance from the lens to the object to provide a 1 to $n$ film image to object size with an erect, reverted image wherein a size reduction of "$n$" times occurs.

15. A camera, as set forth in claim 14, with
$$n=1$$
said lens being located equal distance along the light path from the film to the object.

16. A camera, as set forth in claim 14, with
means for advancing the film in the direction of the scan
$$\frac{n-1}{n}$$
of the scan distance during the film exposure.

17. A camera, as set forth in claim 16, with
means for returning the film the distance
$$\frac{n-2}{n}$$
at the end of a scan to position the film for the next exposure scan.

18. A camera, as set forth in claim 17, with
$$n=3$$

19. A camera for bringing an image for a picture out of a relatively inaccessible place or cavity, like bringing the image of teeth from a human mouth, comprising
   a film carrier located outside said cavity,
   means for bringing the image out of said cavity piecemeal by line scanning onto the film on said carrier during picture taking,
   a lens for forming the image of said object on said film,
   a lens carrier carrying said lens and having relative movement with respect to said object and film for providing said line scanning,
   a light beam deviating means, and
   light means on said lens carrier traveling with said carrier during scanning and shining onto said object through said associated light beam deviating means scanning the object.

20. A camera for bringing an image for a picture out of a relatively inaccessible place or cavity, like bringing the image of teeth from a human mouth, comprising
   a film carrier located outside said cavity,
   means for bringing the image out of said cavity piecemeal by line scanning onto the film on said carrier during picture taking,
   a lens for forming the image of said object on said film,
   a lens carrier carrying said lens and having relative movement with respect to said object and film for providing said line scanning,
   a light means illuminating said object and being energized actuated at the beginning end of said scan and de-energize actuated at the finish end of said scan, and
   means responsive to the movement of said carrier for actuating said light means at one end of said scan.

21. A camera for bringing an image for a picture out of a relatively inaccessible place or cavity, like bringing the image of teeth from a human mouth, comprising
   a film carrier located outside said cavity,
   means for bringing the image out of said cavity piecemeal by line scanning onto the film on said carrier during picture taking,
   a lens for forming the image of said object on said film,
   a lens carrier carrying said lens and having relative movement with respect to said object and film for providing said line scanning,
   light means illuminating said object and being energize actuated at the beginning end of said scan and de-energize actuated at the finish end of said scan, and
   means responsive to the movement of said carrier for actuating said light means at both ends of said scan.

22. A camera for bringing an image for a picture out of a relatively inaccessible place or cavity, like bringing the image of teeth from a human mouth, comprising
   a film carrier located outside said cavity,
   means for bringing the image out of said cavity piecemeal by line scanning onto the film on said carrier during picture taking,
   a lens for forming the image of said object on said film,
   a lens carrier carrying said lens and having relative movement with respect to said object and film for providing said line scanning,
   light means on said lens carrier traveling with said carrier during scanning,
   said lens being a photographic lens, and
   light collimating lens means directing the light from said light means to said object,
   said light means being constructed to shine its light rays onto said object to transmit the image of said object to said film by reflected light.

23. A camera for bringing an image for a picture out of a relatively inaccessible place or cavity, like bringing the image of teeth from a human mouth, comprising
   a film carrier located outside said cavity,
   means for bringing the image out of said cavity piecemeal by line scanning onto the film on said carrier during picture taking,
   a lens for forming the image of said object on said film,
   a lens carrier carrying said lens and having relative movement with respect to said object and film for providing said line scanning,
   light means on said lens carrier traveling with said carrier during scanning;
   said lens being a photographic lens;
   a light deviating means; and
   a viewing window;

said lens, light deviating means and viewing window being operatively connected together so that the light path sequentially passes from light means to collimating lens, light deviating means, window, object, light deviating means, photographic lens and film;

said light deviating means being tipped at least one degree from the position reflecting the image of said light means into said photographic lens.

24. A camera for bringing an image for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, the inside surface of said carrier straddling the light path through said lens being flocked to reduce light reflections.

25. A camera for bringing an image for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, light means illuminating said object, and a green filter intercepting the light emitted by said light means to darken the gum tissue in the photograph of the dental camera to provide more contrast with the white teeth.

26. A camera for bringing an image for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, light means illuminating said object, said moving lens carrier providing an approximately uniform photographic exposure time by scanning for each picture, a choice of two filters being provided for alternatively intercepting the light emitted by said light means, said filters having factors selected complementary to the speeds of two different speed films, so that use of one of said filters and one of said films will require approximately the same exposure time as use of the other filter and the other of said films, whereby both films will be compatible with said uniform exposure time.

27. A camera for bringing an image for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, light means moving with said lens carrier for transferring the image of said object to said film, operative means responsive to motion of said lens carrier at one end of said scan for cutting off the exposure of said film.

28. A camera for bringing an image for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, operative means responsive to motion of said lens carrier at one end of said scan for cutting off the exposure of said film, a light beam deviating means on said carrier for changing the direction of the image carrying light beam between generally angularly inclined to, and to the same, direction as the scan and carrier travel, said operative means including an opaque baffle intercepting said light beam at said one end of said scan for cutting off the exposure of said film by said beam at the finish end of said scan.

29. A camera for bringing an image for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, light means moving with said lens carrier for transferring the image of said object to said film, a shutter movable on said carrier between positions transmitting and intercepting the scanned light beam between said object and film, and operative means responsive to start motion of said lens carrier in the scanning direction for opening said shutter to start the exposure of said film.

30. A camera for bringing an image for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, a shutter movable on said carrier between positions transmitting and intercepting the scanned light beam between said object and film, operative means responsive to start motion of said lens carrier in the scanning direction for opening said shutter to start the exposure of said film, motor means for driving said carrier by said shutter in forward and reverse directions, and a light beam deviating means on said carrier for changing the direction of the image carrying light beam between generally inclined to, and to the same, direction as the scan and carrier travel, said operative means including a lost motion connection between said shutter and carrier movable in the direction of motor drive, whereby moving said carrier in the reverse of said scanning direction causes said shutter to intercept said beam to cut off film exposure during movement in said reverse direction.

31. A camera for bringing an image for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, a shutter movable on said carrier between positions transmitting and intereecepting the scanned light beam between said object and film, operative means responsive to start motion of said lens carrier in the scanning direction for opening said shutter to start the exposure of said film, motor means for driving said carrier by said shutter in forward and reverse directions, and a light beam deviating means on said carrier for changing the direction of the image carrying light beam between generally inclined to, and to the same, direction as the scan and carrier travel, and said operative means including a lost motion connection between said shutter and carrier movable in the direction of motor drive, whereby the start of motor drive in said forward direction sequentially opens said carrier shutter and drives said carrier in said forward direction so that the light beam strikes the film and the motor means drives said carrier throughout travel in said forward direction after opening of said shutter.

32. A camera for bringing an image for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, a shutter movable on said carrier between positions transmitting and intercepting the scanned light beam between said object and film, operative means responsive to start motion of said lens carrier in the scanning direction for opening said shutter to start the exposure of said film, said operative means including means for more slowly scanning the beginning of said scan than the rest of said scan so that a uniform light beam will give uniform exposure over the film during the whole scan.

33. A camera for bringing an image for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, operative means for delivering to said film an image of said object having substantially equal increments of light on equal areas of the film throughout the scan; said last mentioned means including motor means for driving said carrier in a forward direction during line scanning by said carrier, and light means carried by said carrier for illuminating said object during scan in said forward direction, said light means being constructed to shine its light rays onto said object to transmit the image of said object to said film by reflected light.

34. A camera for bringing an image for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, operative means for delivering to said film an image of said object having substantially equal increments of light on equal areas of the film throughout the scan; said last mentioned means including motor means for driving said carrier in a forward direction during line scanning by said carrier, and light means carried by said carrier for illuminating said object during scan in said forward direction, said motor means driving said carrier in said forward direction at a substantially constant scan speed, and said light means illuminating said object with substantially steady and unvarying illumination during scan.

35. A camera, as set forth in claim 34, with said motor means including a constant speed electric motor.

36. A camera, as set forth in claim 34, with said motor means including a spring drive and escapement mechanism speed control.

37. A camera, as set forth in claim 36, with said escapement mechanism including meshing rack and oscillating pawl.

38. A camera, as set forth in claim 34, with said motor means including a spring drive and dash pot speed control.

39. A camera, as set forth in claim 38, with a relatively wide and flat mouthpiece adapted to be received between the occlusal teeth surfaces of the subject being photographed, said carrier being telescopically slidable into and out of said mouthpiece and forming therewith said dash pot.

40. A camera, as set forth in claim 34, with said motor means being a manually controlled driving force on said carrier.

41. A camera for bringing an image for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, operative means for delivering to said film an image of said object having substantially equal increments of light on equal areas of the film throughout the scan; said last mentioned means including motor means for driving said carrier in a forward direction during line scanning by said carrier, and light means carried by said carrier for illuminating said object during scan in said forward direction, said motor means driving said carrier in said forward direction at a non-uniform speed but by a consistent speed pattern throughout each of said scans, and said light means including light intensity varying means for varying the intensity of illumination as a function of the location of the light beam in said scan so that the image of said object has substantially equal increments of light on equal areas of the film throughout the scan in spite of the non-uniform speed to provide an exposed film of generally uniform density.

42. A camera, as set forth in claim 41, with
said motor means including a spring-type driving motor.

43. A camera, as set forth in claim 41, with
said light intensity varying means including a variable resistance in the energizing circuit of said light means changeable as a function of said location.

44. A camera, as set forth in claim 41, with
a variable density negative intercepting the scanned light beam over said film as a light filter and having a density made by exposing a negative film to an object comprising a constant light source.

45. A method for bringing the image of teeth from a human and taking a picture thereof, wherein said teeth have not only said occlusal surface but also vestibular, labial and buccal side and oral side surfaces, comprising scanning across the occlusal surface of the teeth in the upper or lower jaw during picture taking, imposing the scanned image of this surface of such teeth on the film, deviating a beam of light containing the image of one of said side surfaces from a plane of said one side surface for said teeth into the plane of said occlusal surface, and simultaneously photographing said occlusal and said last mentioned side surface on said film by scanning said occlusal surface.

46. A method of taking a picture of the occlusal surface of the teeth in a living human jaw with a camera located between the teeth of the upper and lower jaw and wherein said teeth have not only said occlusal surface but also vestibular, labial and buccal side and oral side surfaces, comprising placing a film outside of the mouth cavity and approximately coplanar with the occlusal surface being photographed as an image during picture taking, separating the mating occlusal surfaces not more than one inch, projecting a light beam generally perpendicularly down onto the plane of said occlusal surface, deviating a beam of light containing the image of one of said side surfaces from a plane of said one side surface for said teeth into the plane of said occlusal surface, simultaneously photographing said occlusal and said last mentioned side surface on said film by scanning said occlusal surface, by bringing the image out of the mouth cavity piecemeal by line scanning onto the film during picture taking and by transferring the image to the film for photographing on said film said image substantially orthographically perfect along the depth of the mouth cavity to give on the film true relative dimensions of the object to the image along said depth by moving a lens optically connecting the film and object by line scanning with this movement of the lens performing the functions required to take a photograph on the film and to produce on said film an image erect and reverted during this approximately coplanar relationship, reverting this film image to an unreverted image on a photographic print, and alternatively photographing the occlusal surface and the vestibular and labial surface of the teeth with the same camera.

47. A method of taking a picture, as set forth in claim 46, by providing generally uniform illumination on the camera film from a constant light source wherein the camera normally transmits non-uniform illumination from said source, comprising exposing a negative in the camera to a constant light source, developing the negative to suitable density, and placing the developed negative over the film in the camera as a light filter of the exact reciprocal of the light distribution to compensate for light variations.

48. A camera for bringing the image of teeth from a human mouth, comprising a relatively wide and flat mouthpiece adapted to be received between the occlusal surfaces of the subject being photographed, said mouthpiece having a picture taking window on one side thereof adapted to face and abut one of said occlusal surfaces;

a resilient pad carried by said mouthpiece on the side opposite said window so that the opposing teeth can clamp on said pad to hold the camera steady during picture taking of said occlusal surface;

a sleeve telescopically receivable over said mouthpiece and having a transparent portion at least coextensive with said window so that each subject photographed may use an individual and sanitary sleeve while his teeth are being photographed;

an anti-fogging agent applied to said transparent portion, said teeth having not only said occlusal surface but also vestibular, labial and buccal outside and oral inside surfaces;

light beam deviating means for deviating a beam of light containing the image of one of said side surfaces from a plane of said side surface for said teeth into the plane of said one occlusal surface so that said camera can simultaneously photograph said one occlusal and said last mentioned side surface on said film;

a film location plane in said camera, said camera having the film location plane approximately coplanar with said one occlusal surface being viewed through said viewing window during picture taking;

means for line scanning in one direction across the one occlusal surface of the teeth and the film location to impose the scanned image of this surface of such teeth on the film substantially orthographically perfect along the depth of the mouth cavity to give on the film true relative dimensions of the object to the image along said depth by an image on said film erect and reverted, comprising a lens for forming the image of said one surface as the object on said film, a lens carrier carrying said lens and having relative movement with respect to said one surface and film for providing said line scanning, two light beam deviating means on said carrier straddling said lens and facing said lens and respectively facing and scanning associated object and film with both the film and object being located on the same side of the axis of the lens and with the lens located along the light path relative to the film 1/$n$th the distance from the lens to the object to provide a 1 to $n$ film image to object size wherein a size reduction of "$n$" times occurs, light means on said lens carrier traveling with said carrier during scanning and shining onto said one surface through said associated light beam deviating means scanning the object, said light means illuminating said object and being energize actuated at the beginning end of said scan and de-energize actuated at the finish end of said scan, means responsive to the movement of said carrier for actuating said light means at both ends of said scan, a light path sequentially passing from light means to collimating lens, light deviating means, window, object, light deviating means, photographic lens, light deviating means and film, said light deviating means associated with said object being tipped at least one degree from the position reflecting the image of said light means into said photographic lens, a shutter movable on said carrier between positions transmitting and intercepting the scanned light beam between said object and film, and operative means responsive to start motion of said lens carrier in the scanning direction for opening said shutter to start the exposure of said film, said operative means including means for more slowly scanning the beginning of said scan than the rest of said scan so that a uniform light beam would give uniform exposure over the film during the whole scan; and printing means for reverting this image to an unreverted image on a photographic print.

49. A camera, as set forth in claim 48, with $$n=1$$

said lens being located equal distance along the light path from the film to the object.

50. A camera, as set forth in claim 48, with means for advancing the film in the direction of the scan $$n-1/n$$

of the scan distance during the film exposure, means for returning the film the distance $$n-2/n$$

at the end of a scan to position the film for the next exposure scan, and $$n=3$$

51. A camera for bringing an image for a picture of an object out of a relatively inaccessible place or cavity like bringing the image of teeth from a human mouth, comprising a film carrier for supporting a film located outside said cavity, photographic means moving a narrow elongated scan band along a scanning direction perpendicular to the length of said band and across the object and film location during picture taking for bringing by said scan band the image of the object out of said cavity piecemeal by line scanning onto the film on said carrier during picture taking, said photographic means including a lens and means for moving said lens across said object in said scanning direction during picture taking.

52. A camera, as set forth in claim 51, with the length of said scan band being substantially greater than the aperture of said lens.

53. A camera, as set forth in claim 52, with the length of said scan band being at least four times the corresponding dimension of the aperture of the lens.

54. A camera, as set forth in claim 51, with said photographic means including light ray masking means restricting light rays to said film to a long narrow rectangle small in said scanning direction.

55. A camera, as set forth in claim 54, with the length of said rectangle being at least four times its width.

56. A camera, as set forth in claim 54, with said masking means including generally flat opaque surfaces defining the size and shape of said scan band.

57. A camera, as set forth in claim 54, with said masking means including an elongated light deviating means defining the size and shape of said scan band.

58. A camera for bringing an image of an object for a picture out of a relatively inaccessible place or cavity, like bringing the image of teeth from a human mouth, comprising a film carrier located outside said cavity, means for bringing the image out of said cavity piecemeal by line scanning onto the film on said carrier during picture taking, a lens for forming the image of said object on said film, a lens carrier carrying said lens and having relative movement with respect to said object and film for providing said line scanning, and light means for projecting light onto said object to be reflected as an image of said object through said lens onto said film, and two light deviating means with one between the object and lens and the other between the lens and film for deviating the reflected light image from said object through the lens to said film.

59. A camera, as set forth in claim 51, with a mouthpiece having a bore therethrough and adapted to be held stationary in the mouth while taking pictures of teeth in said mouth, said lens moving means including a lens carrier generally complementary to said bore in peripheral cross section and telescopically movable in said bore in the scanning direction during picture taking.

References Cited

UNITED STATES PATENTS

| | | | |
|---|---|---|---|
| 1,214,016 | 1/1917 | Dawson | 95—12.20 |
| 1,326,499 | 12/1919 | Hedberg | 58—117 |
| 2,072,390 | 3/1937 | Hartingsvelt | 95—11 |
| 2,198,115 | 4/1940 | John. | |
| 2,464,793 | 3/1949 | Cooke | 95—15 X |
| 2,957,766 | 10/1960 | Woodacre | 96—27 |
| 3,020,799 | 2/1962 | Schwarzbach. | |

JOHN M. HORAN, *Primary Examiner.*

UNITED STATES PATENT OFFICE
CERTIFICATE OF CORRECTION

Patent No. 3,382,781                                            May 14, 1968

William L. Hamilton

It is certified that error appears in the above identified patent and that said Letters Patent are hereby corrected as shown below:

Column 4, line 29, "cheeks" should read -- cheeks. --; line 60, "interestiving" should read -- interesting --. Column 7, line 75, "di comfort" should read -- discomfort --. Column 12, line 3, "(true" should read -- (True --; line 7, "sight)" should read -- sight.) --. Column 14, line 46, "rheostate 60" should read -- rheostat 60 --; line 47, "rheostate 59" should read -- rheostat 59 --. Column 16, line 35, "distance)." should read -- distances). --; line 57, "(or line image" should read -- (or line) image --; line 71, "still picture" should read -- still picture. --. Column 19, line 10, "1/n the" should read -- 1/nth the --; line 38, "2/3 of" should read -- 2/3rds of --; line 39, "moves Periscope" should read -- moves. Periscope --. Column 20, line 51, "traverse to" should read -- transverse to --. Column 21, line 37, "holds 130a" should read -- holes 130a --; line 40, "hold 183c" should read -- hole 183c --. Column 22, line 16, "speed, (this" should read -- speed (This --; line 18, "paper), so" should read -- paper) so --; line 63, "201 on" should read -- 201 in --. Column 24, line 61, "claim 8 with" should read -- claim 8, with --. Column 25, line 39, "1/n the" should read -- 1/nth the --; line 44, "n=1" should read -- $n=1$, --; line 61, "n=3" should read -- $n=3$. --. Column 26, line 17, "a light" should read -- light --; line 18, "gized" should read -- gize --. Column 28, line 4, "film," should read -- film, and --. Column 30, line 4, "incduding" should read -- including --. Column 33, line 30, "n=1" should read -- $n=1$, --; line 35, "n-1/n" should read -- $\frac{n-1}{n}$ --; line 40, "n-2/n" should read -- $\frac{n-2}{n}$ --; line 43, "n=3" should read -- $n=3$. --.

Signed and sealed this 3rd day of February 1970.

(SEAL)
Attest:

EDWARD M. FLETCHER, JR.
Attesting Officer
                                         WILLIAM E. SCHUYLER, JR.
                                         Commissioner of Patents